(12) United States Patent
Tanner et al.

(10) Patent No.: US 10,574,999 B2
(45) Date of Patent: Feb. 25, 2020

(54) METHOD AND SYSTEM OF VIDEO CODING WITH A MULTI-PASS PREDICTION MODE DECISION PIPELINE

(71) Applicant: INTEL CORPORATION, Santa Clara, CA (US)

(72) Inventors: Jason Tanner, Folsom, CA (US); Jay Patel, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 15/147,043

(22) Filed: May 5, 2016

(65) Prior Publication Data

US 2017/0324973 A1    Nov. 9, 2017

(51) Int. Cl.
*H04N 19/53* (2014.01)
*H04N 19/176* (2014.01)
*H04N 19/192* (2014.01)
*H04N 19/139* (2014.01)
*H04N 19/523* (2014.01)
*H04N 19/105* (2014.01)
*H04N 19/567* (2014.01)

(52) U.S. Cl.
CPC ......... *H04N 19/176* (2014.11); *H04N 19/105* (2014.11); *H04N 19/139* (2014.11); *H04N 19/192* (2014.11); *H04N 19/523* (2014.11); *H04N 19/53* (2014.11); *H04N 19/567* (2014.11)

(58) Field of Classification Search
CPC .. H04N 19/176; H04N 19/567; H04N 19/523; H04N 19/105; H04N 19/192; H04N 19/53; H04N 19/139

USPC ....................................................... 375/240.16
See application file for complete search history.

(56) References Cited

U.S. PATENT DOCUMENTS

| | | | | |
|---|---|---|---|---|
| 6,269,174 | B1* | 7/2001 | Koba | H04N 19/51 348/154 |
| 7,876,819 | B2* | 1/2011 | Wang | H04N 19/147 375/240.01 |
| 10,291,925 | B2* | 5/2019 | Holland | H04N 19/43 |
| 2006/0114993 | A1* | 6/2006 | Xiong | H04N 19/172 375/240.11 |
| 2008/0043841 | A1* | 2/2008 | Su | H04N 19/533 375/240.16 |
| 2012/0230417 | A1* | 9/2012 | Sole Rojals | H04N 19/463 375/240.18 |
| 2013/0259129 | A1* | 10/2013 | Sato | H04N 19/513 375/240.12 |
| 2014/0307777 | A1* | 10/2014 | Sole Rojals | H04N 19/176 375/240.02 |
| 2015/0319442 | A1* | 11/2015 | Puri | H04N 19/61 375/240.15 |
| 2016/0198166 | A1* | 7/2016 | Kudana | H04N 19/194 375/240.15 |
| 2018/0007365 | A1* | 1/2018 | Lawrence | H04N 19/139 |

OTHER PUBLICATIONS

Murmu et al, Fast motion estimation algorithm in H.264 standard (Year: 2011).*

* cited by examiner

*Primary Examiner* — Shan E Elahi
(74) *Attorney, Agent, or Firm* — Green, Howard & Mughal LLP.

(57) ABSTRACT

Techniques related to video coding with a multi-pass prediction mode decision pipeline.

25 Claims, 11 Drawing Sheets

- OBTAIN A PLURALITY OF FRAMES OF A VIDEO SEQUENCE WHEREIN INDIVIDUAL FRAMES ARE DIVIDED INTO BLOCKS OF PIXEL DATA 402
- GENERATE A BEST PREDICTION MODE DECISION OF INDIVIDUAL CURRENT BLOCKS OF ONE OF THE FRAMES COMPRISING: 404
  - PERFORM MULTIPLE PREDICTION PASSES FOR AN INDIVIDUAL CURRENT BLOCK COMPRISING FORMING A PREDICTION MODE DECISION AT EACH PASS OF THE MULTIPLE PREDICTION PASSES 406
  - PERFORM AT LEAST A FIRST PASS WITHOUT USING DATA FROM OTHER BLOCKS ON THE SAME FRAME AS THE CURRENT BLOCK TO DETERMINE A MOTION VECTOR OF THE CURRENT BLOCK AND OF THE FIRST PASS 408

METHOD AND SYSTEM OF VIDEO CODING WITH A MULTI-PASS PREDICTION MODE DECISION PIPELINE

BACKGROUND

Due to ever increasing video resolutions, and rising expectations for high quality video images, a high demand exists for efficient image data compression of video while performance is limited for coding with existing video coding standards such as H.264 or H.265/HEVC (High Efficiency Video Coding) standard. The aforementioned standards use expanded forms of traditional approaches to address the insufficient compression/quality problem, but often the results are still insufficient.

The conventional video coding processes use inter-prediction at an encoder to reduce temporal (frame-to-frame) redundancy. This is accomplished by first performing motion estimation to determine where the same or similar image data has moved between a reference frame and a current frame being analyzed. The frames are often divided into blocks, and the motion is represented by a motion vector that indicates where a block has moved from frame-to-frame. Motion compensation is then performed to apply the motion vector to construct a prediction block for a current frame to be reconstructed. The difference in image data of a block between the prediction and real (original or actual) data is called the residual data and is compressed and encoded together with the motion vectors.

The motion estimation may be performed in a number of ways. One way is to perform a search on a reference frame for one or more blocks that match a block being analyzed on the current frame. The searches, however, can be very computationally large. Thus, in order to reduce the number of searches that must be performed, a spatial technique may be applied as well. This includes computing a motion vector for a current block being analyzed by using the motion vectors of other neighbor blocks in the same frame as the current frame being analyzed. This is often some mathematical combination of the motion vectors on adjacent blocks such as a mean or median motion vector of the block above and to the left of the current block. Neighbor blocks near a current block being analyzed may be used because neighbor blocks are likely to correspond to the same moving object with similar motion and the motion of the object is not likely to change relatively abruptly from one frame to the next.

Specialty fixed function hardware and graphics processing unit (GPU) resources are often used to speed up video encoding. Such hardware may have parallel circuits that perform many simultaneous computations which can be very efficient when the same computation must be performed for thousands of blocks of pixel data in order to video encode a frame as with motion estimation. This efficiency, however, must be balanced against the use of spatial dependency between different blocks which is needed to optimize quality for an encoder. That spatial dependency is used to derive predicted motion vector(s) which becomes a skip or merge candidate for a prediction mode, and the starting point for delta motion vectors.

To perform the spatially dependent motion estimation using neighbor block data on the same frame as the current block, the analysis of the current block must wait for the motion vectors to be determined on the neighbor blocks. In other words, the motion estimation techniques that heavily rely on spatial dependencies restrict the amount of parallelism, or the amount of blocks that can be analyzed at the same time by the fixed function hardware. When the spatial dependent motion estimation is performed by traditional wavefront techniques where the system waits to analyze a wave or line of front blocks until after the analysis of a previous line of blocks is complete and their motion vectors established, this can significantly underutilize and slow a hardware system with large parallel computational capacity. While certain systems that only process one block at a time for pure fixed function encoders, this may not be a problem. For hybrid encoders which use some software and some hardware, however, the spatial dependency may or may not be an issue depending on the amount (and in turn the capacity) of hardware. As the amount of hardware increases, the spacial dependency can become a greater limiting factor that limits the amount of computations (blocks, or other units) that can run in parallel on the hardware.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 4 is a flow chart of a method of video coding with a multi-pass prediction mode decision pipeline;

DETAILED DESCRIPTION

Figure 1:
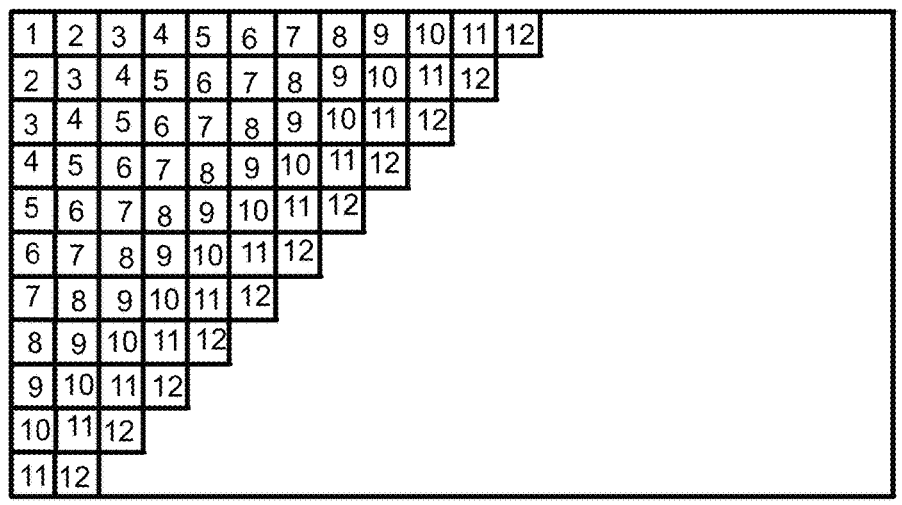
FIG. 1 is a schematic diagram showing a frame divided into blocks and numbered in a simplified waveform arrangement for motion estimation.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to video coding with a multi-pass prediction mode decision pipeline.

Video encoding includes a decoding loop that determines predicted image data in the form of prediction blocks to reconstruct frames. The difference between the predicted block and the actual (or real or original) block is a residual, and the residual is compressed and transmitted to a decoder rather than the full actual block values. To determine the data of the prediction block, the predictions are calculated from either intra prediction that only uses data from blocks on the same frame (spatial prediction) to construct a current block, or inter-prediction that uses blocks from one or more reference frames (temporal prediction). Both of these, intra and inter prediction, may have more than one different mode used to compute candidate prediction block data. A mode selector then selects a best prediction mode among the candidates, which is typically the prediction block with the image data closest to that of an actual block. Herein, the term prediction mode may refer to a specific technique for computing prediction data depending on the context. Thus, both inter-prediction techniques such as zero motion vector and hierarchical motion estimation may be considered two different prediction modes for inter-prediction for example. Intra-prediction and inter-prediction also generally may be referred to as prediction modes herein.

Inter-prediction includes motion estimation to determine where the same or similar image data has moved between a reference frame and a current frame being analyzed. The motion is represented by a motion vector that indicates where a block has moved from frame-to-frame. Motion compensation is then performed to apply the motion vector to construct the prediction block for a current frame to be a candidate to determine the final residual.

The motion estimation may be performed in a number of ways. One way is by block matching to perform a search on a reference frame for one or more blocks that best match a block being analyzed on the current frame. The searches, however, can be very computationally large. Thus, in order to reduce the number of searches that must be performed, a spatial technique may be applied as well. This includes computing a motion vector for a current block being analyzed by using the motion vectors of other neighbor blocks in the same frame as the current block being analyzed. This is often some mathematical combination of the motion vectors of nearby blocks such as a mean motion vector of the motion vectors of blocks that are adjacent to the current block. Maintaining these dependencies between blocks can be essential for a quality encoder to provide very accurate high quality images.

On the other hand, since the analysis of the current block must wait for the motion vectors to be determined on the neighbor blocks that the current block depends upon, this makes the hardware run less efficiently. Specifically, these motion estimation techniques that heavily rely on spatial dependencies restrict the amount of parallelism, or the amount of blocks that can be analyzed at the same time. When the spatial dependent motion estimation is performed by traditional wavefront techniques where the system waits to analyze a wave or line of front blocks until after the analysis of a previous line of blocks is complete and their motion vectors established, this significantly underutilizes and slows a hardware system with parallel computational capacity.

Referring to FIG. 1 for example, this spatial determination of motion vectors creates dependencies where each block typically depends on the block above it and the block to the left of it. For example, frame 100 provides a simplified arrangement of block waves to be analyzed for explanation. When a frame 100 begins to process, it starts by running the first block at the (0,0) location (block 1). Even if there is enough hardware for 10 blocks to be running, only that first block runs since the others depend on the result from that first block. After that block 1 finishes, the blocks (2) below and to the right can process. Note the blocks also could be indicated by their coordinates (n,0) and (0,n) where n is 16, 32, or 64 corresponding to the n×n block size for AVC, VP8, HEVC, and/or VP9 where n is the number of pixels on a single side of a square block for example (although blocks can be rectangular). The block numbers shown on frame 100 indicate a number of the diagonal row or wave that is formed for parallel processing, and blocks with like numbers in the same diagonal row are analyzed in parallel together. Thus, then two blocks (2) are running in parallel and as those blocks finish, then blocks 3, then blocks 4, until ramped up to its peak capacity at row 11 with a maximum here of 11 blocks that can run in parallel based on the data of the row 10 before it. Then a row 12 at full capacity runs with 11 parallel blocks in the diagonal waveform. At a peak, the most blocks running in parallel will be the number of rows/n. And eventually the blocks running in parallel decreases back to one at block (w,h) (or w−n, h−n when the upper left corner block is block 0) where w is the frame width and h is the frame height. It will be understood that much more complex wave arrangements are actually used where the first block is block 0. In one example, blocks 1 and 2 along the first row of the frame may be analyzed first before starting the next row. Many variations are possible.

This limit to parallel processing created by using spatial dependencies for motion estimation is compounded by the increasing capacity of the hardware such as fixed function hardware reserved for repetitious encoding tasks such as those performed with motion estimation. Early hardware architectures had limited video motion estimation (VME) engine hardware units so this approach was very efficient at least when the peak capacity was reached where the maximum number of blocks that could be computed in parallel filled the capacity of the hardware; or in other words, the VME HW was fully utilized. Now, however, more VME HW units are used with a single computing device resulting in significant underutilization of the VMEs.

In addition, next generation codecs now use larger block sizes (n), which reduce the number of parallel executing blocks and increases the ramp up or ramp down periods from a single block to or from the maximum number of parallel blocks being analyzed. The larger blocks cause increased periods with spatially dependent motion estimation because it takes a longer amount of time for a system to analyze each large block compared to smaller blocks such that the corresponding wait for the system to analyze the blocks needed as reference blocks to the next blocks is longer. For example, if a block of N×N takes X time, then checking 2N×2N takes 4× that time plus some delta for checking the 2N×2N block. Specifically, the wait time is partially due to the permissible variations in sub-block sizes that can be used for prediction and that is each checked for distortion (or bit cost). An N×N block would involve one check of N×N, and other checks for the possible sub-block variations of the N×N block such as two N×N/2, two N/2×N, four N/2×N/x, and etc. to smaller sizes like N/4. However, if each spatial dependency is 2N×2N, such sub-block variations are now generally quadrupled for each 2N×2N block, and it takes 4× the time per 2N×2N and half as many things (blocks) can run in parallel. This results in the number of blocks that can run in parallel decreasing with larger block sizes that are provided by the newer codecs (HEVC/VP9) relative to the prior (AVC/VP8), and the number of hardware units on a device are expected to increase even more over time. Thus, less blocks in parallel and more hardware results in a situation where instead of being limited by the hardware, the systems, especially high end coding systems, cannot keep the hardware busy enough when spatial dependency is being used.

One approach attempts to resolve this problem by breaking up the dependencies by breaking a frame into multiple separated waves for improved performance and hardware utilization. The separate waves may be formed by partitioning the frame into different spatial regions through slices or tiles where one wave may start on a left side of the frame and another near the center for example so that both waves move to the right as processing continues. This permits more blocks to be analyzed in parallel. Unfortunately, this also results in a decrease in compression efficiency because every block has a predicted motion vector that is the cheapest to encode into the bitstream. That predicted motion vector is derived from the neighbor blocks. When an artificial wavefront is used, the blocks beginning the wave have no previous blocks to depend on so that some predictor is used such as hierarchical motion estimation (HME) as the predicted motion vector. If the predictor matches a final predicted motion vector for the block exactly, then there is no loss in compression. However, at least some error usually exists and results in paying more bits for how the initial guess at the predictor differs from the final predicted motion vector. This may include paying more bits for longer motion vectors (due to the error) when there may not have been any motion vector needed at all depending on the winning motion estimation prediction mode.

To resolve these issues, a method and system are provided that can maintain compression efficiency while still providing high performance images with great accuracy. This is accomplished by using multiple passes to determine alternative candidate prediction data for multiple prediction modes for individual blocks and that can be used to select the best mode for the block. In order to maintain compression efficiency as well as high performance with high quality images, the method does not use the spatially dependent modes until later passes on the block. By one specific example, for all passes before a final (or last) pass, there are no spatial dependencies between blocks used to find motion vectors for motion estimation. This allows the hardware to run at maximum utilization. The final pass will use dependencies but also may use the information from prior passes to significantly shorten the time of the final pass by eliminating the need to perform integer motion estimation for example. This also may include reducing the number of blocks that even need to be analyzed with the dependencies so that the final pass may be omitted for a significant number of blocks. Given the full hardware utilization from prior passes, the overall performance is higher. The number of passes between a first pass and the final pass may vary depending on content analysis or the parallelization limits of the hardware being used.

Figure 2:
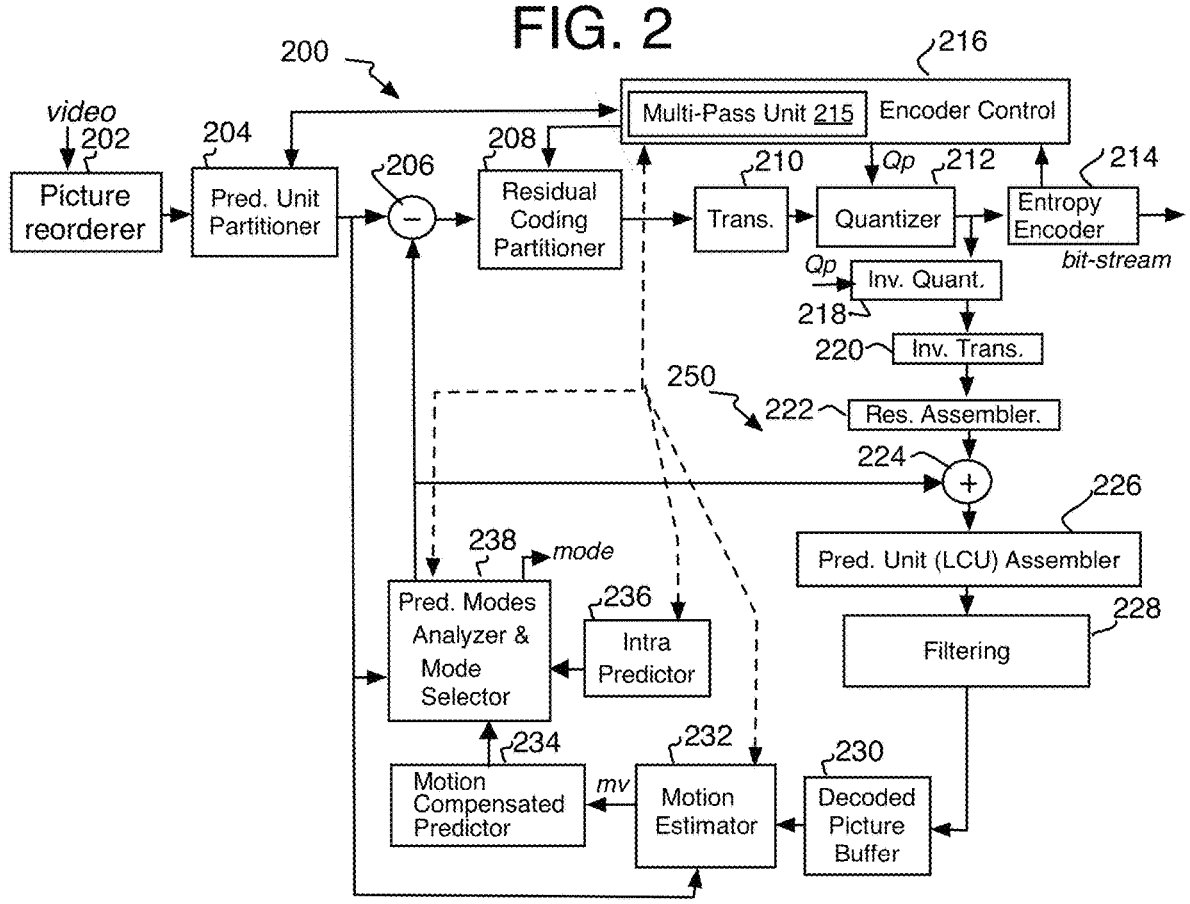
FIG. 2 is an illustrative diagram of an example encoder for a video coding system.

Referring to FIG. 2, a video coding system 200 is described for better understanding of the implementations of the methods of video coding with multi-pass prediction mode decision pipeline described herein, and is arranged to perform at least one or more of the implementations described herein. In various implementations, video coding system 200 may be configured to undertake video coding and/or implement video codecs according to one or more standards. Further, in various forms, video coding system 200 may be implemented as part of an image processor, video processor, and/or media processor and undertakes inter-prediction, intra-prediction, predictive coding, and residual prediction. In various implementations, system 200 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, and others. Although system 200 and/or other systems, schemes or processes may be described herein, the present disclosure is not necessarily always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

For the example video coding system 200, the system may be an encoder where current video information in the form of data related to a sequence of video frames may be received for compression. The system 200 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 200 may include an input picture buffer (with optional picture re-orderer) 202, a prediction unit partitioner 204, a subtraction unit 206, a residual partitioner 208, a transform unit 210, a quantizer 212, an entropy encoder 214, and an encoder controller 216. The controller 216 manages many aspects of encoding including rate distortion or scene characteristics based locally adaptive selection of right motion partition sizes, right coding partition size, best choice of prediction reference types, and best selection of modes as well as managing overall bitrate in case bitrate control is enabled to name a few examples. Accordingly, and most relevant here, the controller 216 may have a multi-pass unit 215 (also referred to herein as a multi-pass prediction mode decision unit) that controls and tracks the use of multiple passes for determining prediction modes for blocks of a frame and other prediction data as described in detail below The output of the quantizer 212 may be provided to a decoding loop 250 provided at the encoder to generate the same reference or reconstructed blocks, frames, or other units as would be generated at the decoder. Thus, the decoding loop 250 may use inverse quantization and inverse transform units 218 and 220 to reconstruct the frames, and residual assembler 222, adder 224, and prediction unit assembler 226 to reconstruct the units used within each frame. The decoding loop 250 then provides filters 228 to increase the quality of the reconstructed images to better match the corresponding original frame. This may include a deblocking filter, a sample adaptive offset (SAO) filter, and a quality restoration (QR) filter. The decoding loop 250 also may have a decoded picture buffer 230 to hold reference frames.

The encoder 200 also has a motion estimation module or unit 232 that provides motion vectors as described below, and a motion compensation module 234 that uses the motion vectors to form prediction blocks. The motion estimation unit 232 and motion compensation unit 234 form the inter-prediction capability of the encoder. It will be understood, and as explained in detail below, the motion estimator 232 may use a variety of techniques to form the motion vectors including block matching such as hierarchical motion estimation (HME), integer motion estimation (IME), and fractional motion estimation (FME), spatial dependencies, and zero motion vectors (ZMVs) all explained in detail below. An intra-frame prediction module 236 provides the intra-prediction capability. Both the motion compensation module 234 and intra-frame prediction module 236 may provide predictions to a prediction mode analyzer and mode selector 238 that selects the best prediction mode for a particular block and as instructed by the multi-pass unit 215. It will be understood that while the multi-pass unit 215 is shown as part of the encode control 216, it could be considered to be partially or wholly a part of the prediction mode analyzer and mode selector 238.

As shown in FIG. 2, the prediction output of the selector 238 in the form of a prediction block is then provided both to the subtraction unit 206 to generate a residual, and in the decoding loop to the adder 224 to add the prediction to the residual from the inverse transform to reconstruct a frame. A PU assembler (not shown) may be provided at the output of the prediction mode analyzer and selector 238 before providing the blocks to the adder 224 and subtractor 206 for HEVC operation.

More specifically, the video data in the form of frames of pixel data may be provided to the input picture buffer 202. The buffer 202 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frames), and B-frame (inter-coded frame which can be bi-directionally predicted from a previous frames, subsequent frames, or both). In each case, an entire frame may be classified the same or may have slices classified differently (thus, an I-frame may include only I slices, P-frame can include I and P slices, and so forth. In I slices, spatial prediction is used, and in one form, only from data in the frame itself. In P slices, temporal (rather than spatial) prediction may be undertaken by estimating motion between frames but also may include spatial dependencies to derive motion vectors as explained herein. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 204 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block may also be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 26×26, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like, or otherwise a 4×4 or 8×8 or other not necessary rectangular shaped block. By some alternatives, this may include considering the block a macroblock or a division of a macroblock of video or pixel data for H.264/AVC, VP8, VP9, and the like, unless defined otherwise.

Also in video coding system 200, the current video frame divided into LCU, CU, and/or PU units may be provided to the motion estimation unit or estimator 232. System 200 may process the current frame in the designated units of an image in raster or different scan order such as waveforms mentioned elsewhere herein. When video coding system 200 is operated in inter-prediction mode, motion estimation unit 232 may generate a motion vector in response to the current video frame and a reference video frame in the order of the multi-pass mode decision pipeline described below. A number of different block-based search methods are described herein and may be used to match a block of a current frame with one or more candidate blocks on a reference frame, and thereby determine a motion vector to be encoded for a prediction block. Otherwise, other motion estimation methods to determine a motion vector may be used that reduce the need for block matching at an individual block including the spacial dependency methods, using a ZMV, or using the motion vector of blocks on a previous frame as described in detail below, and to name a few examples. As described, the motion estimation may be performed in multiple passes so that the spatial dependency is not used until later passes, and in one form, not until a final or last pass for a block reserved for spatial dependency motion estimation, and where the final pass may be omitted as unnecessary depending on the prediction mode results as explained below. The motion compensation module 234 then may use the reference video frame and the motion vector provided by motion estimation module 232 to generate the predicted frame.

The predicted block then may be subtracted at subtractor 206 from the current block, and the resulting residual is provided to the residual coding partitioner 208. Coding partitioner 208 may partition the residual into one or more blocks, and by one form for HEVC, dividing CUs further into transform units (TU) for transform or further compression, and the result may be provided to a transform module 210. The relevant block or unit is transformed into coefficients using variable block size discrete cosine transform (VBS DCT) and/or 4×4 discrete sine transform (DST) to name a few examples. Using the quantization parameter (Qp) set by the controller 216, the quantizer 212 then uses lossy resampling or quantization on the coefficients. The generated set of quantized transform coefficients may be reordered and entropy coded by entropy coding module 214 to generate a portion of a compressed bitstream (for example, a Network Abstraction Layer (NAL) bitstream) provided by video coding system 200. In various implementations, a bitstream provided by video coding system 200 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage.

The output of the quantization module 212 also may be provided to de-quantization unit 218 and inverse transform module 220 in a decoding loop. De-quantization unit 218 and inverse transform module 220 may implement the inverse of the operations undertaken by transform unit 210 and quantization module 212. A residual assembler unit 222 may then reconstruct the residual CUs from the TUs. The output of the residual assembler unit 222 then may be combined at adder 224 with the predicted frame to generate a rough reconstructed block. A prediction unit (LCU) assembler 226 then reconstructs the LCUs from the CUs to complete the frame reconstruction.

The reconstructed frames are filtered, and then provided to a decoded picture buffer 230 where the frames may be used as reference frames to construct corresponding predictions for motion estimation and compensation as explained herein. When video coding system 200 is operated in intra-prediction mode, intra-frame prediction module 236 may use the reconstructed pixels of the current frame to undertake intra-prediction schemes that will not to be described in greater detail herein.

In some examples, video coding system 200 may include additional items that have not been shown in FIG. 2 for the sake of clarity. For example, video coding system 200 may include a processor, a radio frequency-type (RF) transceiver, splitter and/or multiplexor, a display, and/or an antenna. Further, video coding system 200 may include additional items such as a speaker, a microphone, an accelerometer, memory, a router, network interface logic, and so forth. Some of these components are shown on other implementations described herein.

Figure 3:
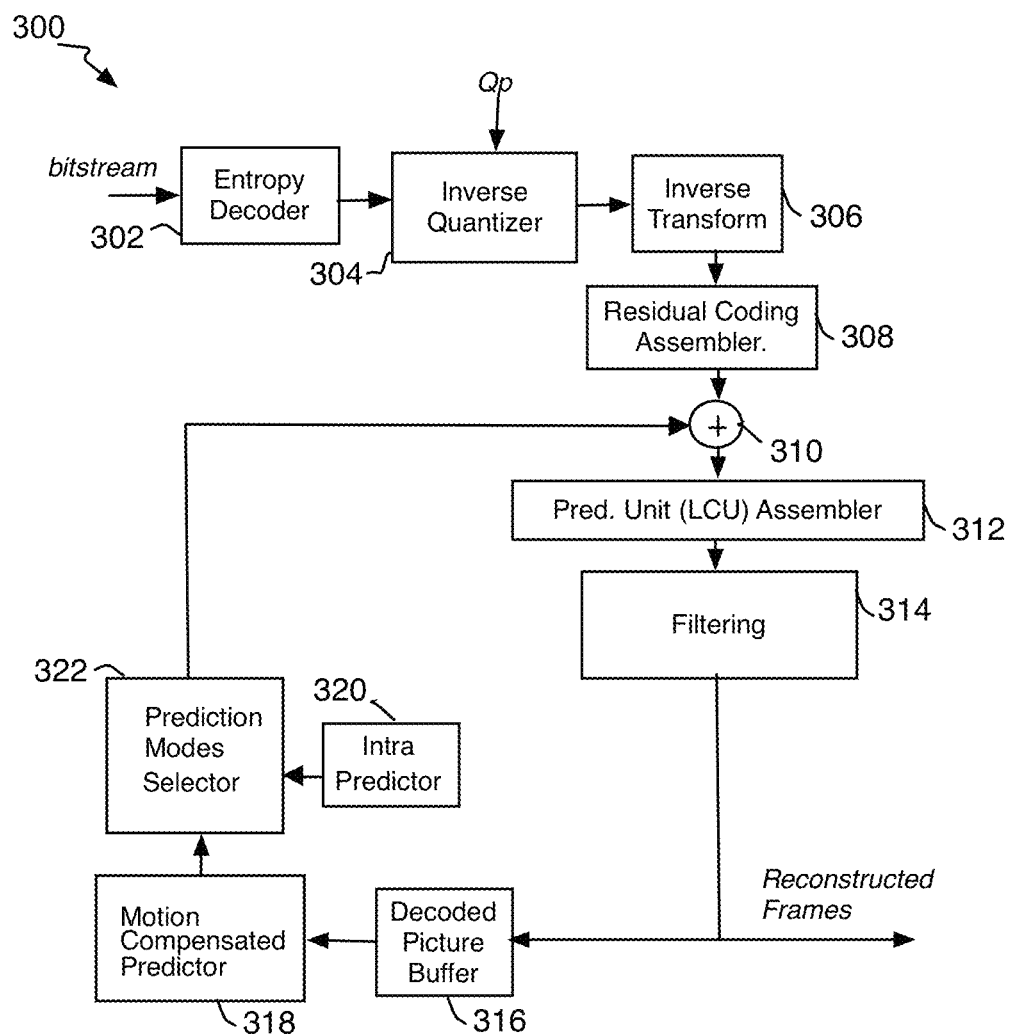
FIG. 3 is an illustrative diagram of an example decoder for a video coding system.

Referring to FIG. 3, a system 300 may have, or may be, a decoder, and may receive coded video data in the form of a bitstream and that has residuals, motion vectors, and prediction modes for individual blocks that are established by the use of the multi-pass prediction mode decision pipeline at the encoder. The system 300 may process the bitstream with an entropy decoding module 302 to extract quantized residual coefficients as well as the motion vectors, prediction modes, partitions, quantization parameters, filter information, and so forth. The system 300 then may use an inverse quantizer module 304 and inverse transform module 306 to reconstruct the residual pixel data. The system 300 then may use a residual coding assembler 308, an adder 310 to add the residual to the predicted block, and a prediction unit (LCU) assembler 312. The system 300 also may decode the resulting data using a decoding loop employed depending on the coding mode indicated in syntax of the bitstream and implemented via prediction mode switch or selector (which also may be referred to as a syntax control module) 322, and either a first path including an intra prediction module 320 or a second path that is an inter-prediction decoding path including one or more filters 314. The second path may have a decoded picture buffer 316 to store the reconstructed and filtered frames for use as reference frames as well as to send off the reconstructed frames for display or storage for later viewing or another application or device. A motion compensated predictor 318 utilizes reconstructed frames from the decoded picture buffer 316 as well as motion vectors from the bitstream to reconstruct a predicted block. Thus, the decoder does not need its own motion estimation unit since the motion vectors are already provided, although it still may have one. In this case, the decoder may have its own unit for implementing the multi-pass prediction mode decision pipeline. A prediction modes selector 322 sets the correct mode for each block, and a PU assembler (not shown) may be provided at the output of the selector 322 before the blocks are provided to the adder 310. The functionality of modules described herein for systems 200 and 300, except for the units related to the multi-pass prediction mode decision pipeline such as the multi-pass unit 215, selector 238, and aspects of the motion estimator unit 232 for example and described in detail below, are well recognized in the art and will not be described in any greater detail herein.

Some video encoders are implemented in software and others with full or partial hardware acceleration. Fully hardware accelerated solutions don't offer as much scalability and flexibility as the partial or hybrid solutions. Herein, the efficiency of hybrid architecture for video encoding can be improved using the multi-pass prediction mode decision methods described. With hybrid solutions, some work can be performed on execution units (EUs) and other work may be performed on fixed function hardware. To maximize the performance, the fixed function hardware is fully utilized. The present encoder that performs the methods described herein may use one or more video motion estimate (VME) engines as the main fixed function hardware.

Referring now to FIG. 4, an example process 400 is arranged in accordance with at least some implementations of the present disclosure. In general, process 400 may provide a computer-implemented method of video coding with a multi-pass prediction mode decision pipeline as mentioned above. In the illustrated implementation, process 400 may include one or more operations, functions or actions as illustrated by one or more of operations 402 to 408 numbered evenly. By way of non-limiting example, process 400 may be described herein with reference to operations discussed with respect to FIGS. 2-3 and 10 herein and may be discussed with regard to example systems 200, 300 or 1000 discussed below.

The process 400 may comprise "obtain a plurality of frames of a video sequence to encode wherein individual frames are divided into blocks of pixel data" 402, and particularly at a decoding loop of an encoder that has intra-prediction and inter-prediction capabilities, and that receives reconstructed and filtered reference frames as well as image data of the current frames to be encoded. A single frame may be divided into a variety of block sizes as with the HEVC systems, and as described elsewhere herein.

The process 400 also may comprise "generate a best prediction mode decision of individual current blocks of at least one of the frames" 404. Once a best prediction mode is selected for a block, that mode is used to compute the predicted image data for the current block. The differences in image data between the current, or now predicted, block and the actual block form a residual that is compressed and placed in a bitstream for transmission to a decoder, also as described above.

To perform the selection of the best prediction mode for a current block, the process 400 may include "perform multiple prediction passes for an individual current block comprising forming a prediction mode decision at each pass of the multiple prediction passes" 406. Specifically, and described in detail below, the multiple prediction passes may include a first pass, at least one mid or middle pass, and a final pass. Each pass includes the performance of certain prediction modes and/or prediction mode data comparisons, and determines a best prediction mode whether a final best prediction mode for the current block, or a preliminary best prediction mode at least up to that point and that is made final or replaced at a later pass. By one approach, the first pass may include performing intra prediction mode computations and inter-prediction mode computations. This may include first determining a predicted motion vector that is the least cost motion vector of the frame. For the first pass, the PMV may be set as a zero motion vector (ZMV) or by block-matching algorithms such as hierarchical motion estimation (HME). Otherwise, the PMV may be set by using the motion vector of the same location as the current block but on the previous frame (referred to herein as the prior frame collocated MV). The PMV then may be used as the cost center for other inter-prediction modes such as full range or short range integer motion estimation (IME), and fractional motion estimation (FME). The best prediction mode among these candidates including the intra prediction results is determined for the first pass, and by one form, by determining the prediction mode with the least overall cost at the best quality.

Process 400 also may include "performing at least a first pass without using data from other blocks on the same frame as the current block to determine a motion vector of the current block and of the first pass" 408. Thus, the arrangement of the multiple pass prediction mode pipeline permits the system to hold off using spatial dependencies to generate motion vectors until a later pass in order to reduce a very significant amount of delay caused by waiting for other neighbor blocks in the frame to complete analysis before performing the prediction analysis for a current block. This reduction may be accomplished by determining a final decision mode on the middle passes, without the need for a later or final pass using the data of other blocks on the frame of the current block at all. This permits many more blocks to be analyzed for prediction mode in parallel. Thus, by one form, the data of other blocks on the same frame as the current block cannot be used to determine a motion vector for the current block until the final pass. By other options, the passes could be altered to permit such use on a middle pass.

In a middle pass then, the PMV of the prior pass (or first pass) is compared to a newly derived PMV of the current pass (the current PMV). The PMV of a middle pass may be a combined form of motion vectors, or image data, from adjacent blocks on the prior frame such as the left and upper block adjacent the same block position corresponding to the position of the current block on the current frame. Since the prediction data of these adjacent blocks were obtained during analysis of the prior frame, there is no significant delay versus the delay of the spatial dependency caused by using blocks on the same frame as the current block. The motion vectors of the prior frame blocks may be combined to a mean or median for example, or the best prior block and best motion vector may be selected as the current PMV instead and based on the least distortion between predicted and actual image data.

When the current and prior PMVs are the same, the prediction mode results of the prior pass are used as the final prediction decision mode. When the PMVs are sufficiently close but not exactly the same, and the distortion of the best prediction mode of the current pass is the same or less than the distortion of the best prediction mode of the previous pass, then again, the prediction results of the previous pass are deemed to be sufficient and are used as the final prediction mode results. When the prior PMV and current PMV are not close, then the process proceeds to perform a full integer search again, a best decision mode, based on least overall cost for example, is determined for the middle pass, and the final pass is then performed where other blocks of the same frame such as nearby (or neighbor or adjacent) blocks to the current block are used to compute a motion vector of the current block. This new accurate PMV of the final pass is then used as the current PMV for the final pass and is used in the same comparisons as mentioned above for the PMVs of the prior passes. The exception is that the best mode decision on the final pass is considered the final best mode decision when the PMV of the prior pass and the PMV of the final pass are still not considered close. Other variations and details are explained below with process 500 and 600.

By some other example aspects, performing the multiple prediction passes also may include such features as reducing the number of reference frames used for the block-matching search techniques to converge on a best reference frame from pass to pass for example. Otherwise, the block size can also be changed and converged to a best block size from pass to pass. In another feature, the number of middle passes also may be adjusted. These changes may occur before the pass begins, or between, or during the passes, and may change from block-to-block, frame-to-frame, or video sequence to video sequence for example. The details are provided below.

Figure 5:
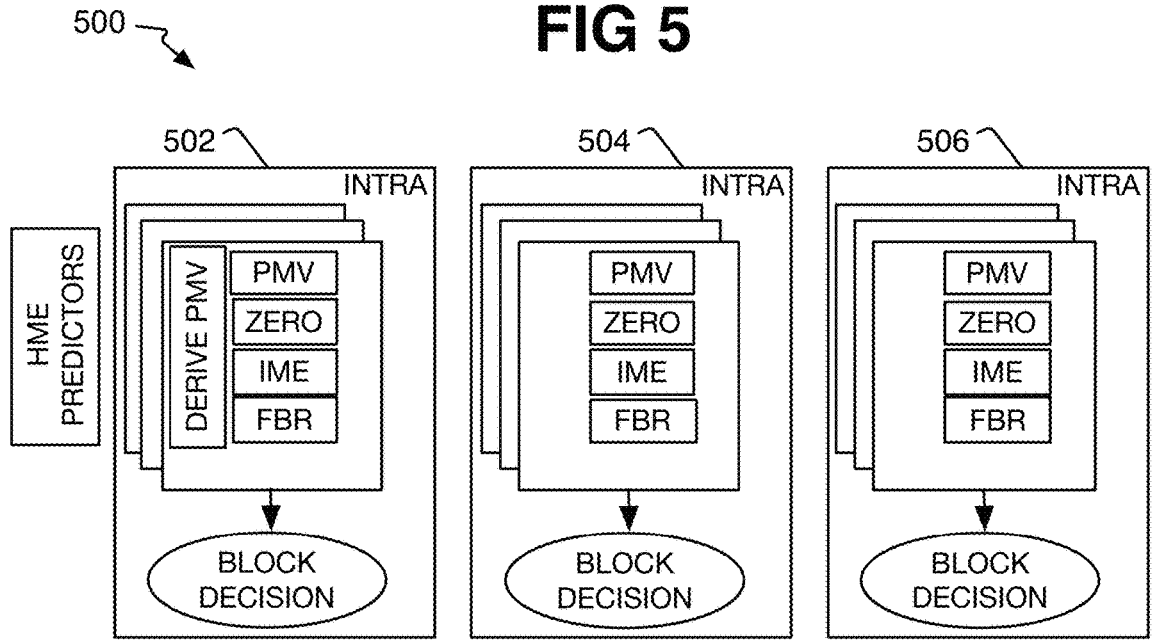
FIG. 5 is a schematic diagram used to show a process of video coding with a multi-pass prediction mode decision pipeline.

Referring now to FIG. 5, a schematic overview of the multi-pass architecture is provided showing the structure for three passes 502, 504, and 506. Motion estimation works at a frame boundary (on a frame-to-frame basis) as described in U.S. Patent Application No. 2013/0266072, published Oct. 10, 2013, which is incorporated herein for all purposes as one possible example. The frame is divided into blocks (16×16 for AVC or VP8, 64×64 or 32×32 for HEVC or VP9) for processing. To process a block, multiple encoding or prediction modes for each block are checked, and the best prediction mode is selected as described below.

The multi-pass architecture provides multiple prediction modes to compute candidate prediction data such as candidate motion vectors (MVs) or other image data (such as luminance and chroma values) for a single block. The present architecture switches from using a conventional single pass per block to using multiple passes. A main kernel is used to run at a frame granularity as in the prior single pass systems. Each kernel produces some data per block that will be passed forward to the future frame calls. That data is used to progressively shorten the subsequent frame calls. There are three types of passes: a first pass 502, at least one mid or middle pass 504, and a final pass 506.

In the first pass 502, hierarchical motion estimation (HME) may be performed to provide an initial HME predictor based on downscaled or down sampled versions of the frame. Either the HME predictor, the zero motion vector (shown as zero), or the prior frame collocated MV (not shown) is used as the initial predicted motion vector (PMV) of the first pass. Intra coding is also performed, and in one case only on the first pass. Then, the PMV may be used as the basis or cost center to perform full integer motion estimation (IME) as well as fractional motion estimation (FME). Here, the FME is indicated as FBR (fraction/bi-directional motion estimation) which refers to the fact that the same circuit may be used for either or both motion estimation prediction modes (fractional, bidirectional where block matching is performed on both a previous and future frame, or both fractional and bidirectional). A best mode decision is then made before continuing with the next pass. The PMV is set as the $PMV_{N-1}$ for the next (middle) pass.

In the middle pass 504, a current PMV is derived by using prediction data of blocks on a previous frame that are neighbor or adjacent blocks to the same corresponding position as the current block on the current frame. When the $PMV_{N-1}$ is equal to the current PMV of the middle pass, then the final prediction mode decision of the earlier (first pass in this case) is set as the final mode decision. The final pass need not be performed. The same results when the PMVs are similar but not exactly the same. In this case, as long as the current PMV is close to the $PMV_{N-1}$, and the current best prior prediction mode distortion (based on the current PMV as the optimal PMV of the middle pass so far) is less than or equal to the prior pass best prediction mode distortion, then the prior pass prediction mode decision is the final prediction mode decision as well. In these cases, both spatial dependency techniques and full integer searches that slow the system can be avoided. When the PMVs are not close, new full integer and fractional searches are performed, and a new mode decision is made for the middle pass and based on overall cost as explained below. Alternatively, when the PMVs are close but the current pass distortion is greater than the prior distortion, a small range integer search and fractional search is made before performing a mode decision for the middle pass. In the latter two cases, further middle passes may be performed depending on the VME capacity and software settings as explained in detail below. Otherwise, the final pass is initiated. It will be understood that the prior PMV could be from any prior pass and need not always be from the closest previous pass.

In the final pass 506, spatial neighbors are used to establish the PMV for the current block. If the current PMV is the same as the PMV of the previous (or prior) pass, then the result (the mode decision) of the previous pass is the final mode decision. Otherwise, when the PMV of the final pass is at least close to the PMV of the previous pass, then the best mode distortions may be compared, as with the middle pass. If the PMVs are not close, (or are close but the current distortion is greater than the previous distortion, then an IME or FME is performed, and a best prediction mode decision based on overall cost and quality is performed except that in the final pass, the mode decision is the final mode decision. The details are provided with process 600 below.

Figure 6A:
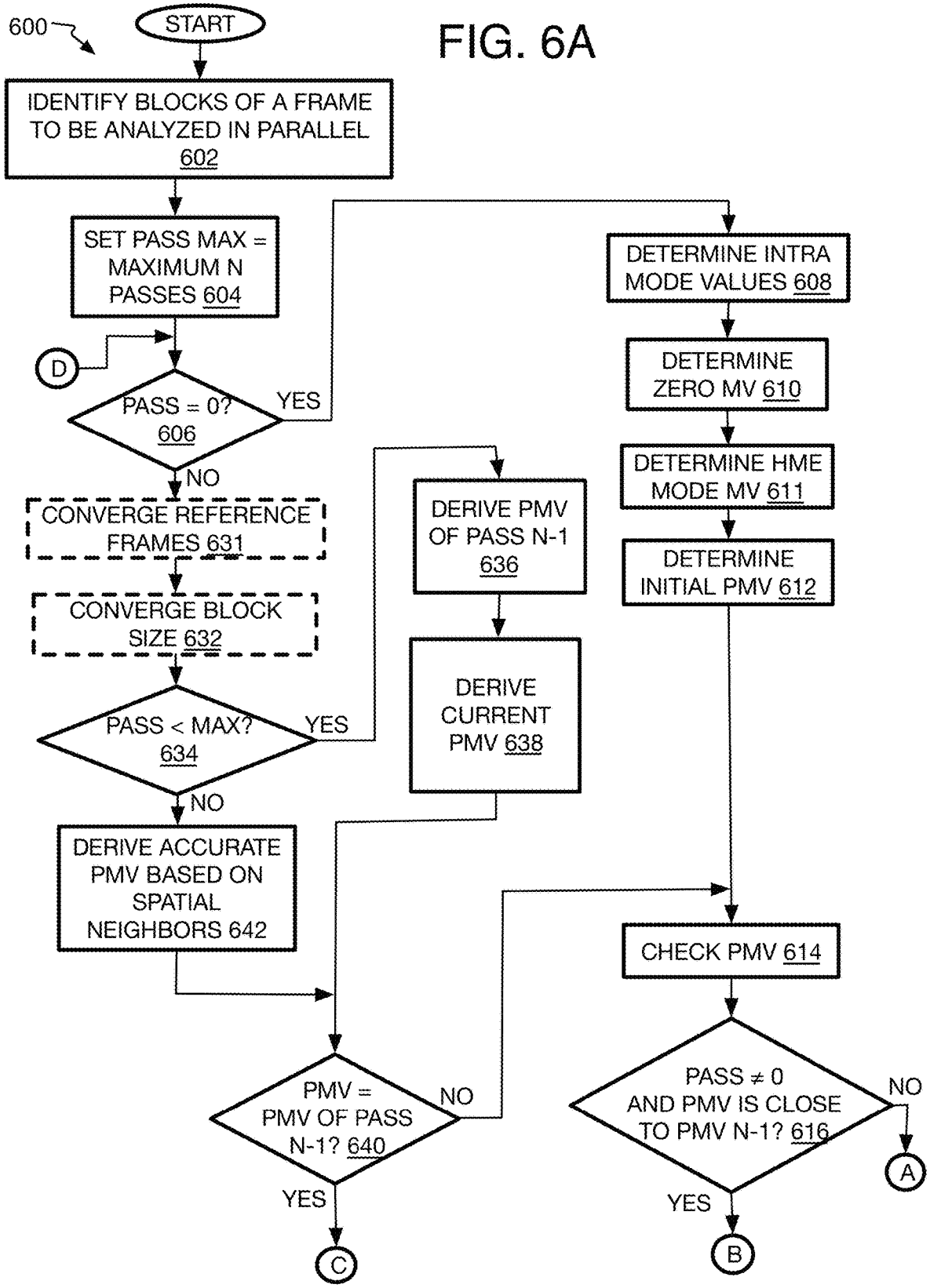
FIGS. 6A-6B is a detailed flow chart of a process of video coding with a multi-pass prediction mode decision pipeline.
Figure 6B:
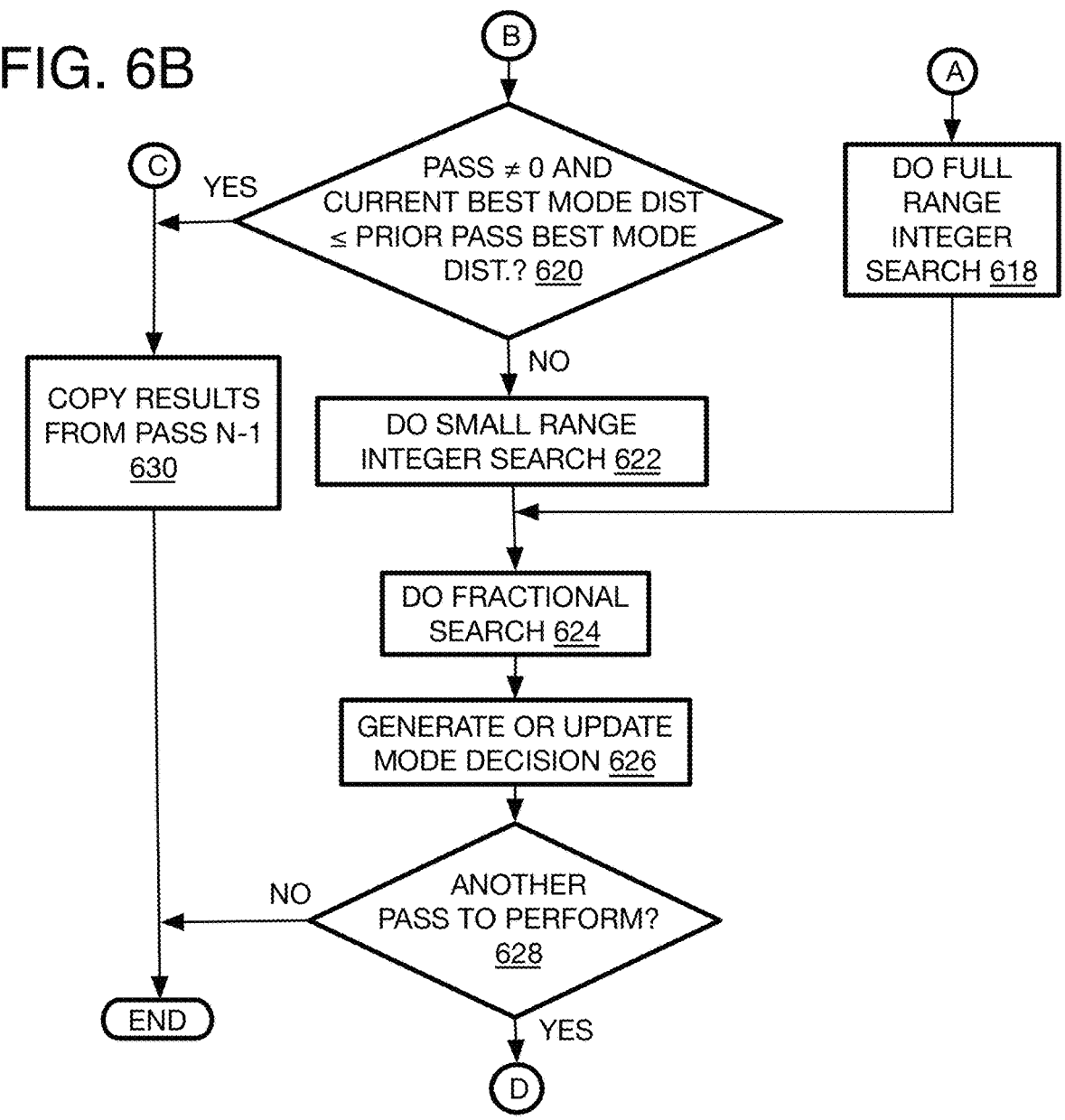

Referring to FIGS. 6A-6B, an example process 600 is arranged in accordance with at least some implementations of the present disclosure. In general, process 600 may provide a computer-implemented method of video coding with a multi-pass prediction mode decision pipeline as mentioned above. In the illustrated implementation, process 600 may include one or more operations, functions or actions as illustrated by one or more of operations 602 to 642 generally numbered evenly. By way of non-limiting example, process 600 may be described herein with reference to operations discussed with respect to FIGS. 2-3 and 10 herein and may be discussed with regard to example systems 200, 300 or 1000 discussed below.

Process 600 may include "identify blocks of the frame to be analyzed in parallel" 602. Image data of blocks that are to be analyzed to determine a best prediction mode of the block are provide to a video motion estimation (VME) engine to perform prediction mode calculations on the image data of multiple blocks in parallel while other prediction mode operations and controls that request the transfer of the block image data to the VMEs are performed via execution units on one or more other processors. The following operations of process 600 are performed for each block of a frame that is to be analyzed. The image data of the blocks may be provided set-by-set that fills the VMEs for example or has some other selected size, or the blocks may be continuously streamed to the VMEs as the blocks are selected for analysis. By one form, the blocks are provided starting from the upper left corner of a frame and proceeding in waveform order in case a final pass must be performed and spatial dependencies for motion vector generation are used. Otherwise, there are many different orders for feeding block data to the VMEs that could be used such as raster order, and so forth. For a non-final pass, the order of receiving the blocks is not limited at all. For the final pass, again any order may be used as long as it permits the use of dependencies. Since the location of the dependencies will be known by the time a final pass is reached, the ordering can be varied as long as blocks to be used as references for other blocks are analyzed before those blocks are needed as references.

Process 600 may include "set pass MAX=maximum N passes" 604. When only one middle pass is to be available, MAX=3. The number of middle passes for each block may be pre-set and fixed, or may vary depending on a number of factors. The number of passes to be used may depend on the number of VME hardware units available and may be pre-set to 1 to 3 mid passes for example. By one alternative form, a current availability of the VME units may be assessed, and the number of mid-passes may be changed from block-to-block, region-to-region, frame-to-frame, or video sequence to video sequence. Also, the number of passes can be set dynamically (on-the-fly) based on how well the frame has resolved. For example, after two passes (a first pass and a single middle pass), if 15% of the frame is resolved and deemed to be correct, and after the third pass (another middle pass), it remains 15%, then do another middle pass before doing the final pass. However, if after two passes, the frame is 90% resolved, then only do a final pass.

By another possible alternative approach, a performance based controller may be used, and could be in software form. The controller could vary the number of passes in real time based on a convergence rate to a final best prediction mode for a block. It could operate on a frame level, region level, or block level to vary the number of passes. The controller could use each pass output, content analysis, and product (hardware) identification to adjust the number of passes. This could help both performance and power.

Process 600 may include "pass=0?" 606, and particularly to determine if the process is starting a first pass of the available multiple passes. In short, the first pass will set the predicted motion vector (PMV) for the first pass, and the PMV may be used as a basis or cost center for some of the prediction modes as explained below. The PMV may be checked to determine whether it is a skip location as well. Intra and inter prediction modes are performed. All blocks can run in parallel since there is no spatial dependency on neighbor blocks of the current frame. A best prediction mode decision is made to determine the best result for the first pass. The PMV and the prediction mode decision of the first pass then may be used in subsequent passes to render the best prediction mode selection of the first pass as the final prediction mode for the current block or to change which prediction mode is the final best prediction mode for the current block.

Now in detail, in the first pass, the process 600 may include "determine intra mode values" 608. Intra prediction uses the spatial neighbor pixels on the same frame to create the image data for a new block. The neighbor pixels are typically selected from blocks above and to the left of the new block position. The result of this intra prediction mode is spatially formed image data for each block being analyzed.

Process 600 may include "determine zero MV" 610, also referred to as zero, ZMV, or the ZMV prediction mode. This is a motion vector of (0,0) or no change in motion from the reference frame to the current frame. Thus, the current block has the same image data in the same location as the reference block.

Process 600 may include "determine HME mode MV" 611. This includes performing hierarchical motion estimation (HME) which is a process of downscaling or down sampling the current frame and the reference frame in order to perform a fast block matching search. The resulting motion vector (MV) is then upscaled to the full resolution. The HME process is described in detail in U.S. Patent Publication No. 2013/0148732, published Jun. 13, 2013, which is incorporated herein for all purposes. The search of the down scaled frame may be centered around the collocated location or zero motion vector location, or the search may be based on a prior hierarchical search based on a lower resolution search. For example, a first hierarchical layer may be down sampled by a factor of two and a second layer by a factor of four for example. Then the results from the four factor down scale search would be fed forward to be sued with the two factor down scale search. Many variations are possible.

Process 600 may include "determine initial PMV" 612. The PMV may be the MV of the HME, the ZMV, or the prior frame collocated PMV or MV. The prior frame collocated MV is the motion vector of the block from the prior frame at the same corresponding location as the current block in the current frame. In other words, the same motion vector (length and direction) that leads to the same block location on the prior frame is used on the current frame so that the current block has the same relative reference block location as the corresponding block location on the prior frame except the reference location may be moved up a frame. Precisely, the reference block for a block on frame N−1 may be on frame N−2. Thus, the current block on frame N has a reference block on frame N−1 set at the same corresponding position as the block on N−2. It will be understood that more than one reference block may be used, and the exact same reference blocks could be used (where the motion vector is changed in this case). By one approach, the prediction mode chosen as the PMV could be the one with the least distortion from the actual image values. In order to be more efficient, since the initial PMV is merely a coarse determination that may be refined anyway, the PMV method may be chosen at random or whichever method uses the least amount of time or computational cost. Otherwise, the PMV method that is the most used method on prior frames may be used, or which PMV method is the most similar to the PMV of a prior frame PMV, or most similar to the three PMV initial values of the prior frame, and so forth.

Process 600 may include "check PMV" 614. For this operation, each of the blocks of a frame are checked for whether it is a skip location which is a point check to determine whether the compression of data on a block is to be skipped because the image data is the same as on another frame (such as on objects that do not move from frame-to-frame in a video sequence) or other blocks in the same frame (such as on a flat uniform color area that does not change from frame-to-frame). No search is being performed. In these cases, no residual data may be compressed and transmitted to a decoder for this block. Inter-prediction blocks may use the skip location as a cost center. As the motion vector search is performed, the motion vectors are penalized greater (given less weight) when a candidate matching block is found further from the cost center. The cost center is important to maintain quality. It will be understood that alternatively, the skip check could be performed before selecting blocks to be provided to the VME in the first place or at least before beginning any inter-predictive calculations so that HME can use the skip locations as cost centers to begin HME block matching searches as well.

At this point, process 600 may include a test "pass≠0 and PMV is close to PMV N−1?" 616. Proceeding in order for the first pass where pass=0, the process 600 may proceed with "do full range integer search" 618. By one conventional block-matching full search, a block on a current frame is compared to each block position of a search window on a reference frame. The lowest sum of absolute difference (SAD), mean square error (MSE), or other metric is considered a best match. While very accurate, performing the full range search in this manner reduces performance. Other techniques used instead as here include a fast motion estimation which often has two stages with a first stage that starts searching around a most expected motion vector or cost center with a minimal step, and uses incremental steps for more distant locations. The most expected motion vector used for the search going forward may be the PMV. Thus, the IME (and FME) can be considered a refinement stage to the PMV determination.

Specifically, the PMV is the lowest cost location (where cost refers to the distortion of prediction data versus actual image data of the block) for the current block and an estimate for the overall cost in bits for the mode. The overall cost is meant to be representative of the bits it takes to encode the coefficients which come from the frequency transform of the residuals between the source and reference block and the bits for the mode decision(s) to use as a motion vector. Some codecs (such as AVC) define one location while newer codecs (HEVC) define multiple candidates (or merged candidates). Any finally encoded motion vector may be encoded as a delta from that PMV location (or one of the merge candidate locations). The IME searches for the ideal motion vector which may not be the PMV location. The PMV may be centered at a first search pattern arrangement with many spaces between examined matching block locations. It is faster but with less accurate results. The cost for the motion vector change is relative to the PMV. When an IME (or FME) mode is searching near and/or far from the PMV location, a cost for the motion vector is greater the further it gets from the PMV location. Thus, in searches for IME (and FME), the PMV is used as the cost center for the search. So PMV and cost center are synonymous more or less, and can be fixed for a block, and the PMV location does not change, even though the block may find a new optimal motion vector that is far away from the PMV cost center.

In the second stage, more points around the best found matching point from the first search pattern arrangement are then checked for the best match. The pattern arrangement may be similar or very different to that used to find the PMV. The farther the best matching point is from a center of the arrangement, the wider is the pattern with greater motion vector cost in some examples.

The result is a motion vector (in x and y coordinates), the image data values as computed from the image values of the reference block (or blocks), and a distortion that is a difference between the predicted and actual image values for the current block and with the IME prediction mode. Thus, the IME (and FME) come up with an optimal motion vector relative to the PMV location being used. That new optimal motion vector will be used on the next frame on the next pass as input to the PMV. It will be understood, however, the optimized motion vector isn't the next pass PMV for the same block because the PMV is derived from neighbor blocks, not the block itself.

After the IME search in the first pass, process 600 may continue with "do fractional search" 624, and particularly perform a block matching search on a sub-pixel level. As mentioned, this may be performed on FBR circuitry that is also used for fractional and bidirectional prediction modes. There are a number of known techniques for fractional searching such as six tap or eight tap filters common in codec standards that need not be described in detail here. Again, the result is a motion vector (in x and y coordinates), the image data values as computed from the image values of the reference block (or blocks), and a distortion between prediction and actual values for this fractional prediction mode.

Process 600 may include "generate or update mode decision" 626. Once the intra, IME and FME prediction modes each provide alternative prediction data for the current block, the results can be compared, and the best prediction mode selected as a preliminary, or best so far, prediction mode for the current block in the first pass. By other forms, the prediction mode of the PMV, or any of the HME, ZMV, and/or prior frame collocated MV prediction modes which may have been used to find a candidate PMV, also may be considered a prediction mode candidate for the best prediction mode decision in the first pass. By one form, the best prediction mode is the one that has the smallest overall cost as defined above. As mentioned, the prediction cost, which is one factor in the overall cost, is the difference between the predicted mode and source pixels. It can be a sum of absolute differences (SAD) or transformed result (SADT). A full discrete cosine transform (DCT) may even be performed as that to be performed to derive the actual coefficients to determine the overall cost. Then the actual cost in bits for the prediction mode or a proxy for how much the mode would be is determined. It can be an inter or intra predicted mode. Also, both can be broken up into smaller sizes, and it can even be a combination of intra and inter modes. This determination also may consider quality as well so that the best prediction mode is the one that gives the best quality at the lowest cost.

In order to provide for greater bandwidth while preserving the results of one pass for the next pass, a single surface allocation may be used to store the mode decisions at each pass. Each pass would read and update the surface. The result would be greater cache hits to reduce bandwidth impact. In the present example then, the results of prediction mode decision would be indicated on the single surface allocation. The data for the latest PMV for the pass including the image data and motion vector of the PMV for the current block also are stored for use by the next pass.

Process 600 may include "another pass to be performed?" 628, and with the first pass, this loops the process to operation 606 to determine if pass=0 to determine which pass is to be performed.

When pass does not equal 0 (when N=1), this begins the middle pass. In short, the mid or middle pass can re-compute a current PMV, check the PMV, and perform integer and fractional modes. Intra and zero are not checked (or re-computed) since they would produce the same value as in the first pass (thus saving VME time). So their distortion and modes (for intra) are obtained from the data from the prior pass. Also, the PMV is derived from the data from the prior pass and is compared to the new current PMV. If the current PMV from the current call is the same as the prior PMV from the prior pass, then the result from the prior call is copied over as the current result (taking no VME time for the applicable blocks).

In more detail, now that the first pass is complete and a middle pass initiated, process 600 may have the option to include "converge reference frames" 631. Thus, the number of reference checks for each successive pass can be reduced by converging upon the best reference per block. This may be determined by selecting the reference block or blocks with the smallest difference with the current block by SAD, MSE or other algorithm. The reference with the least difference is chosen as the reference going forward. Multiple reference checks are computationally expensive. Reducing the number of references to check for the final pass can have good performance gains.

Also optional, process 600 may include "converge block sizes" 632. All of the above prediction modes (PMV, skip, integer, and fractional) can divide the block size to a smaller partition size (n/2, n/4, etc.) when it is advantageous do so. Thus, the check PMV operation can be used to check the current block size in order to better ensure any block-matching operations are using the correct block size. The number of block size checks for each successive pass can be reduced by converging upon the best block size. The block sizes could be changed in each pass to the most used block size on the frame so far such as from a variety of sizes to 32×32 to name one example. This can prove to be very useful since next generation codecs support more block sizes. As a given block is searched, prior passes can provide a good indication of which sizes are worth checking and which aren't.

Process 600 may include "pass<MAX?" 634 to test whether a middle pass or final pass is being analyzed. When the pass is a middle pass, the process 600 may include "derive PMV of pass N−1" 636. Thus, the PMV derived from the first pass is obtained for the middle pass and is now the $PMV_{N-1}$.

Process 600 may include "derive current PMV" 638, and the current PMV for the middle pass is derived from neighbor reference blocks on the prior frame. This may be the left and upper blocks adjacent to the same corresponding block location on the prior frame as the current block on the current frame. The motion vectors of the prior frame blocks may be combined to a mean or median motion vector for the current block, or a best motion vector among them may be selected, such as by least distortion. It should be noted that these prior frame neighbor blocks do not cause a significant delay since their motion vectors are already determined on a prior frame, and versus the delay caused by spatial dependency of blocks on the current frame.

Process 600 may include a test "PMV=PMV of pass N−1?" 640, so that the prior PMV is compared to the current PMV. This test is passed when both PMVs are the same integer values in distance and direction (x and y). If the values are the same, process 600 continues with "copy results from pass N−1" 630, so that the results of the prior pass (here the first pass) are the final prediction mode decision results, and the motion vector and image are provided for residual calculations. It will be understood that the winning result (the optimal MV) in this case could be the PMV such that a motion vector and image data of the PMV are provided for residual calculations. This need not always be so, however, and the IME or FME could also provide a winning result with an optimal MV that is different from the PMV as explained above. Otherwise, the winning result from the prior pass cold be unrelated to the PMV even though the current PMV and prior PMV are equal. Thus, the final prediction mode for the current block may be intra coding data if that was determined as the best prediction mode in the first pass. In this case, the current PMV of the middle pass would be no better than the PMV of the first pass, and therefore intra prediction mode would still be found to be the best mode.

Also, in this case, where the PMVs are the same, the prediction mode selection process is ended for this current block and any subsequent middle pass and the final pass are omitted. This saves VME processing of the spatial dependencies to determine motion vectors entirely for this current block. It also eliminates further IME processing that could be computationally heavy.

Alternatively in the middle pass, when the current PMV is not the same as the prior pass $PMV_{N-1}$, then process 600 returns to operation 614 to check the PMVs as already described above in the first pass, and then back to the test "pass≠0 and PMV is close to PMV N−1?" 616 to test whether the PMV values are close even though not identical. Closeness here is measured as some threshold of pixels in both the x and y directions but could be some combination such as a Euclidean distance. By one form, the threshold difference is set at approximately 10-12 pixels, where the threshold range is determined by experimentation. If the PMVs are not close, the process 600 proceeds with full range IME 618, FME (or FBR) 624, and a new prediction mode decision for the middle pass. In this case, another pass will be performed whether another middle pass if provided by the system, or the process continues to the final pass.

When the compared PMVs in the middle pass are close under the test of operation 616, process 600 then may include another test whether "pass≠0 and current best mode dist.≤prior pass best mode dist.?" 620. The distortion is the difference (such as SAD or MSE) between the predicted image data of the current block and the actual image data. The distortion of the best or winning prediction mode of the prior pass may be based on any of the prediction modes discussed above. By one form, the best prediction mode of the current pass is computed by using the image data of the reference blocks used by the current PMV, and that image data is used to compute or otherwise establish the prediction data for the current block that is differenced from actual image data. When the best prediction mode of the current PMV has a smaller distortion than the distortion of the prior pass, or the distortions are the same (or alternatively at least within a small range), then the prediction mode results from the prior pass N−1 are copied 630 and used as the final prediction mode of the current block. Since the current and prior PMVs are so close in the first place, it is sufficient to use the prediction mode with the higher distortion to be conservative. This may assume the area is likely flat or uniform so any motion vector in the vicinity is as good as the other so that the PMV is adequate since more searching in the vicinity is just going to find similar areas. Also, prior pass motion vector checks for distortions can be stored for future passes. This will reduce the number of duplicate checks.

It will be appreciated that with this arrangement of passes described above whenever the current PMV is the same or close to the PMV of the prior pass in the middle or final pass, this may eliminate the need for the computationally expensive IME. But even further, when the intra mode wins based on having the best prediction mode distortion in the middle or final pass (after finding current and prior PMVs are close), this also can be used to reduce or eliminate integer motion estimation (IME) checks on the inter-prediction side.

When the PMVs are close but the distortion of the best prediction mode of the current pass is greater than the distortion of the prior pass, then the process 600 may include "do small range integer search" 622. Here, the IME search window can be reduced if the current PMV is similar to the prior pass PMV. A smaller search window will result in less compute. The search may be started at the PMV location and the window may be reduced. For example if a 64×64 window is normally checked it could be reduced to 32×32 (or 4X smaller). Thereafter, the FME search 624 may be performed as well, and a new best prediction mode determination 626 may be formed for the middle pass. The process 600 may continue to another middle pass or to the final pass as explained above for when the current and prior PMVs are not close.

Then, process 600 may include "pass<MAX?" 634 again, and to determine if the final pass has been reached where pass N=MAX. If not, another middle pass is performed as described above. If so, the last or final pass is commenced, and will use an accurate PMV derived from neighbor blocks on the current frame as the current PMV and cost center to maintain good quality. Some of the details are provided as follows.

Process 600 may include "derive accurate PMV based on spatial neighbors" 642. Here, the prediction data, and specifically the motion vectors, of the neighbor blocks on the same frame as the current block, or in one form, adjacent blocks to the left and above a current block being analyzed, are used to compute the current predicted motion vector (PMV) of the current block. This may be some combination such as the mean or median of two, three, or more motion vectors and using the values in both the x and y direction. Otherwise, the best MV with the least distortion may be selected among these MV candidates. Such spatial dependency algorithms may include advanced motion vector prediction, block merging techniques, or others depending on the coding specification being used. For example, MPEG2 just uses the left block as a predictor, while AVC uses top, top left and left blocks, and performs the median operation in x and y. HEVC uses a list of predictors and all are skip candidates.

Once the current PMV for the final pass is derived, the current PMV is compared to the PMV of the prior pass 640, and the process continues in operations 614 to 630 as with the middle pass to determine a final best prediction mode. By one approach, the prior PMV (or $PMV_{N-1}$) was the current PMV of the previous pass (the middle pass) and not the PMV of the first pass. By other alternatives, the prior PMV could be the PMV of any prior pass. Once a PMV has been checked at any point in time before, the result for that pass does not change so that it could be copied as the final result. Continuing with the process 600, if the current PMV and PMV of the prior pass are the same (operation 640), the best prediction mode of the prior pass is deemed the final prediction mode of the current block. Alternatively, if the current PMV and the PMV of the prior pass are not close (operation 616) or the current pass best mode prediction distortion is greater than the distortion of the prior pass best mode prediction (operation 620) even though the current PMV and the prior PMV are close, then the best mode prediction decision 626 becomes the final best mode prediction decision after further IME (whether small range or full range) and FME is performed based on the current PMV as a cost center. The best prediction mode decision may consider the current spatially dependent-based PMV as a candidate prediction mode since the final pass is being performed. Thus, the answer to the test as to whether another pass is to be performed 626 is now 'no', and the prediction mode selection process has ended for the current block. The results of the final best prediction mode may be provided for residual calculations, compression, and transmission.

If the current PMV of the final pass becomes the optimal motion vector and final best prediction mode for the current block, that spatially dependent-based motion vector does not necessarily need to be encoded in the bitstream since it can be derived from the neighboring blocks at the decoder. In this case, the headers in the bitstream may carry some indicator that indicates the current block prediction is to be built from the neighboring blocks.

Figure 7:
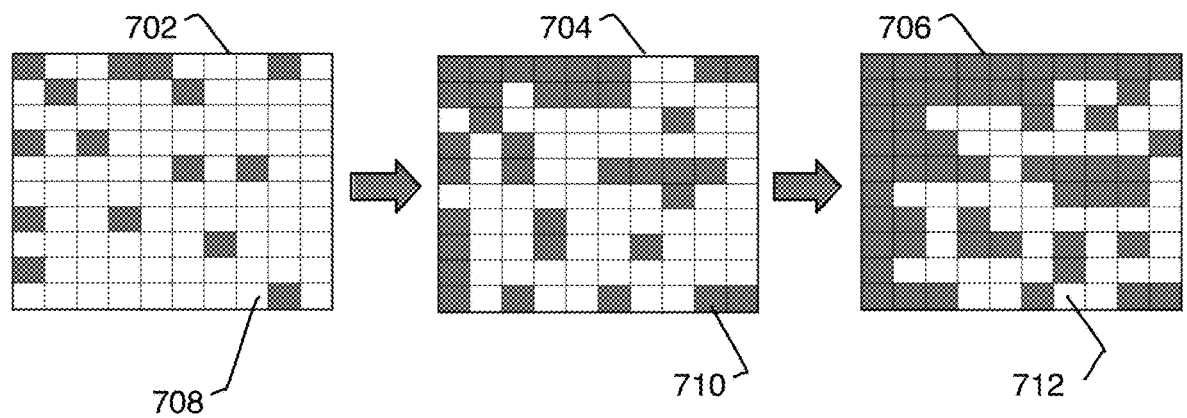
FIG. 7 is a schematic diagram of a frame with blocks in various stages of the process of video coding using a multi-pass prediction mode decision pipeline according to the implementations described herein.

Referring to FIG. 7, and as mentioned above, it has been determined that increasing the hardware capacity of the system by increasing the number of EUs and VMEs does not increase the dependency pass performance. Dependency pass performance can be increased by decreasing the execution times of these passes. Shorter prior pass execution times (without dependencies) will allow more passes, resulting in further performance gains on the final pass. From the first pass, some blocks arrive at the same result they would with accurate predicted motion vectors using dependencies. Each pass becomes more accurate as more blocks converge to what they would with dependencies. Then, the final pass merely needs to check the blocks that haven't converged yet to their optimal result. This is depicted with multi-pass prediction mode system 700 tracking first pass 702, middle pass 704, and final pass 706 each with blocks representing the blocks in an image or frame being analyzed, and where solid blocks 710 show a prediction mode is selected and it has converged to the ideal result, and where the empty blocks 708 or 712 represent a block that does not yet have its final best prediction mode selected yet. It can be seen that the final pass merely needs to resolve the remaining empty blocks 712 with accurate predicted motion vectors using dependencies, which is less than half of the blocks of the frame.

Figure 8:
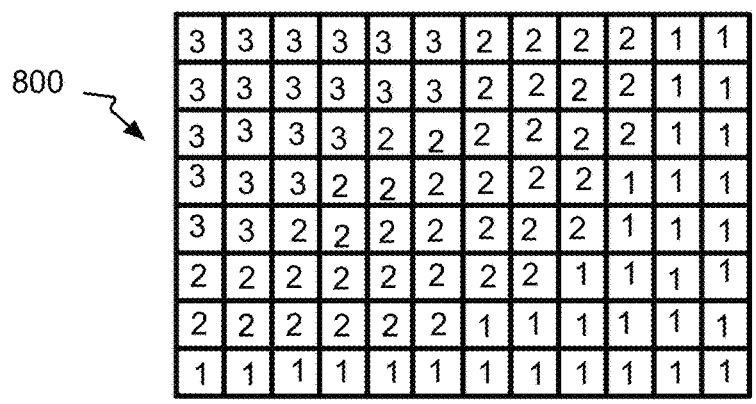
FIG. 8 is a schematic representation of a simplified example scoreboard for tracking which blocks are on which pass.

Referring to FIG. 8, an accelerator or processor performing the prediction computations could be freed up to produce a higher number of CPU computations for other tasks if the code for the operations of each pass is dispatched as a separate batch command. The encoder code may be written in a kernel that runs on the GPU. Thus, here, the commands for every block may be in a batch of commands. The commands are all dispatched to run at the same time and may or may not have dependencies. Thus, the operations to be dispatched may include checking the PMV, the mode decision, and so forth. The use of a single batch command for each pass, however, still requires multiple commands (due to multiple passes) that are sent from a CPU to a GPU for example, and therefore, that may increase overhead and reduce performance. This can be mitigated by dispatching a single batch command from the CPU to the GPU that uses a single kernel binary for multiple or all of the passes of a block.

Specifically, the kernel may iterate through each pass to converge on an output and keep track of each block's pass number in a scoreboard. This method, which can be implemented in software, can reduce CPU computations and bandwidth (shared register space between passes) needed for the prediction mode determination. A single batch command could reduce the cost of ramp up or ramp down to the peak number of active threads for a processor (or fixed function hardware) between passes. As mentioned, this can be accomplished by a memory-based scoreboard 800. The scoreboard 800 may have many different arrangements, and is provided to keep track of the pass number currently being analyzed (the current block pass execution) for each block as shown where passes 1 to 3 are provided. Threads will wait until neighbor blocks from the prior pass are complete to avoid racing conditions where two or more threads are trying to change shared data at the same time. Thus, in one form, a block will only process pass N if pass N−1 neighbor blocks are complete so that in case the block in pass N depends on the neighbor blocks of pass N−1, the block has its neighbors already analyzed and the dependency can be processed.

By one form, the neighbor blocks are the adjacent left and upper blocks. Thus, for example, when a block is analyzing pass 1, it cannot analyze pass 2 until the upper and left neighbor blocks are at least on pass 2 or more, and therefore show a 2 or higher on those neighbor blocks. Even though the pass may have converged in an early pass, such as pass 2, with a final prediction mode, the scoreboard is still updated to the next pass number (here to pass 3) to show that that pass (at least pass 2) is complete so that other blocks can use the block showing pass 3 for dependency.

Figure 9A:
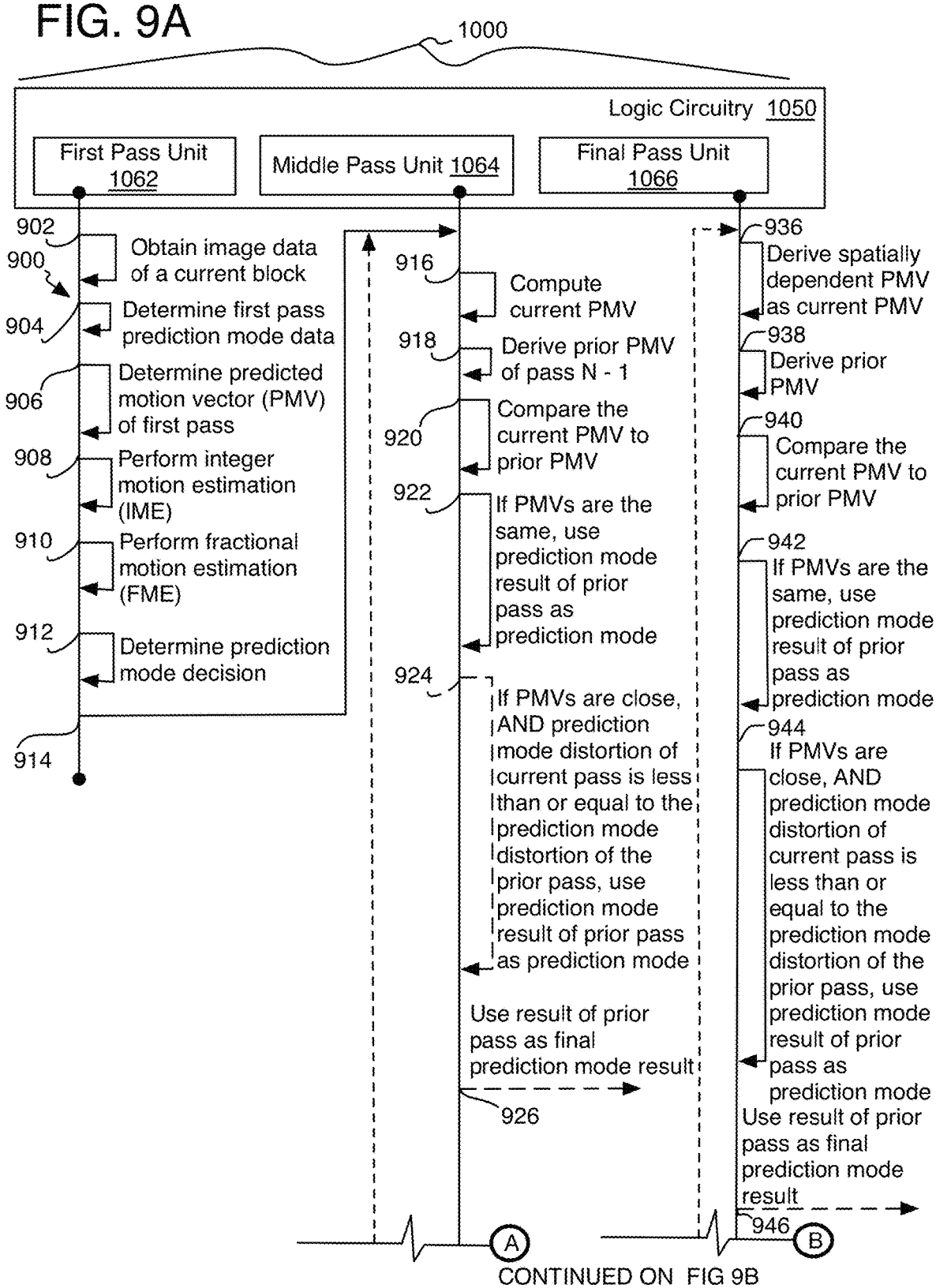
FIGS. 9A-9B is an illustrative diagram of an example system in operation for providing a method of video coding with a multi-pass prediction mode pipeline.
Figure 9B:
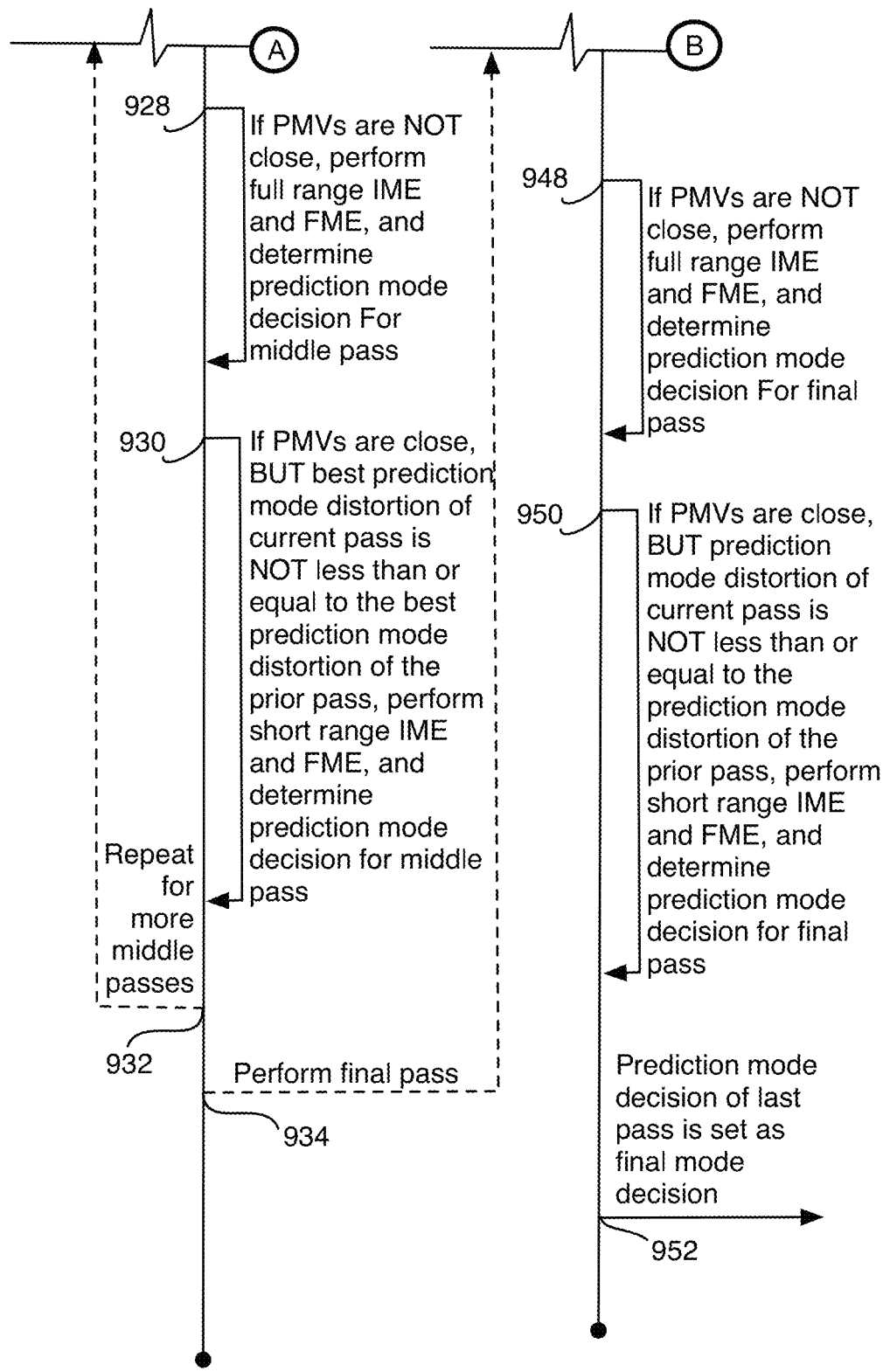

Referring now to FIGS. 9A-9B, system 900 may be used for an example method of video coding with a multi-pass prediction mode decision pipeline shown in operation, and arranged in accordance with at least some implementations of the present disclosure. In the illustrated implementation, process 900 may include one or more operations, functions, or actions as illustrated by one or more of actions 902 to 952 generally numbered evenly, and used alternatively or in any combination. By way of non-limiting example, process 900 will be described herein with reference to operations discussed with respect to any of the implementations described herein.

Figure 10:
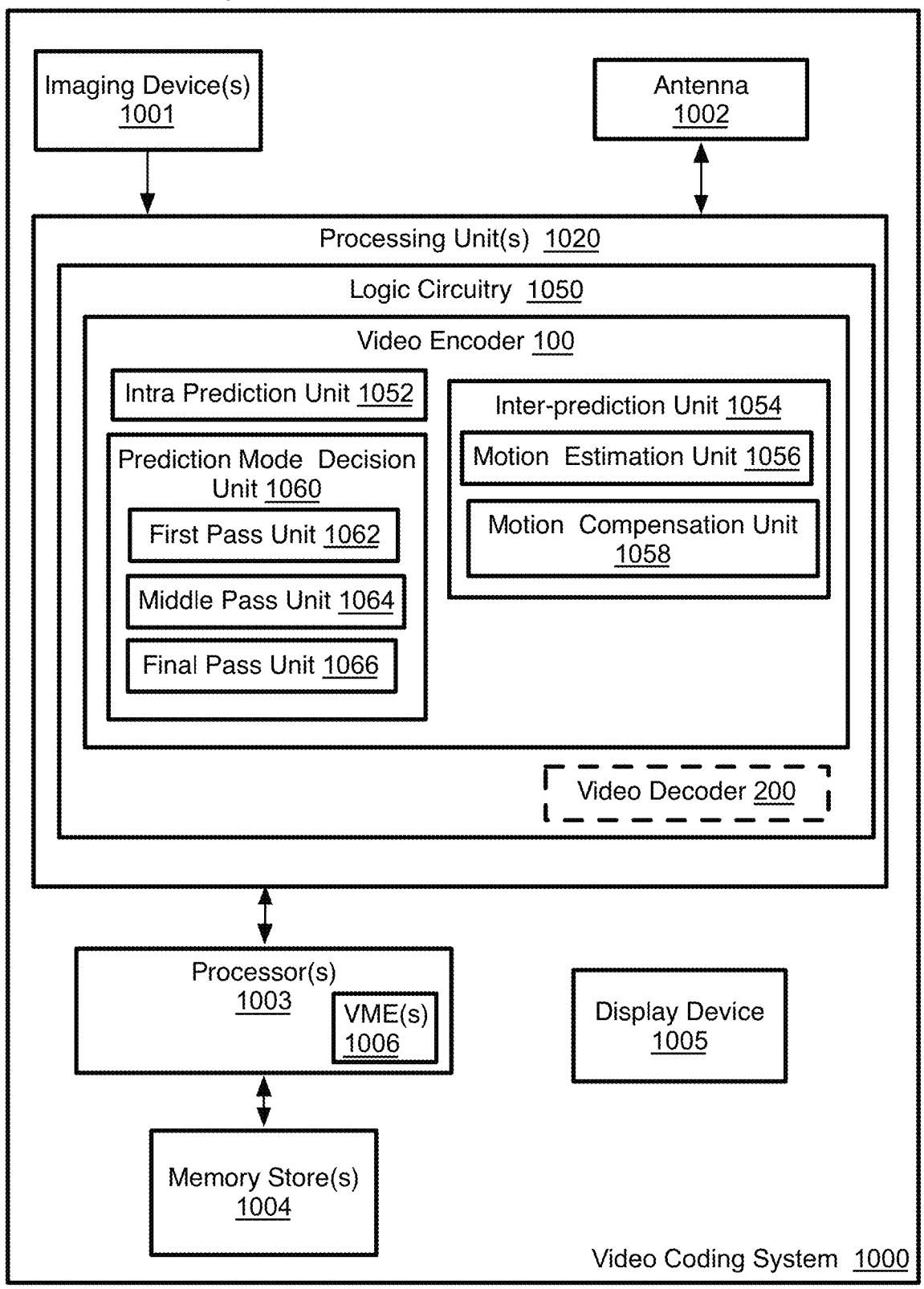
FIG. 10 is an illustrative diagram of an example system.

In the illustrated implementation, system 1000 may include a processing unit 1020 with logic units or logic circuitry or modules 1050, the like, and/or combinations thereof. For one example, logic circuitry or modules 1050 may include the video encoder 100 with a prediction mode decision unit 1060 that may have a first pass unit 1062, a middle pass unit 1064, and a final pass unit 1066 as well as an intra prediction unit 1052 and an inter-prediction unit 1054 with a motion estimation unit 1056 that may perform the variety of motion vector-based prediction modes mentioned herein. Although system 1000, as shown in FIG. 10, may include one particular set of operations or actions associated with particular modules, these operations or actions may be associated with different modules than the particular module illustrated here.

Process 900 may include "obtain image data of a current block" 902, where the system, or specifically the prediction mode units at the encoder, may obtain access to pixel data of both the current blocks of a frame to be encoded and reconstructed frames to be used as reference frames. The data may be obtained or read from RAM or ROM, or from another permanent or temporary memory, as described on systems 1000 or 1100, or otherwise from an image capture device. The access may be continuous access for analysis of an ongoing video stream for example.

Process 900 may include "determine first pass prediction mode data" 904, and this may include using an intra prediction mode to determine predicted image data for the current block, and the distortion between the actual block image data and the predicted image data obtained by the intra coding.

Process 900 may include "determine predicted motion vector (PMV) of first pass" 906, and this may include using an HME block matching mode, ZMV, or the prior frame collocated MV (the motion vector from the location on the prior frame that corresponds to the location of the current block on the current frame as explained above), and set as the initial fixed PMV of the current block in the first pass. The HME may use the ZMV or collocated MV as cost centers. Among these prediction modes, the selection of the prediction mode is determined by the methods mentioned above.

Process 900 may include "perform integer motion estimation (IME)" 908, and Process 900 may include "perform fractional motion estimation (FME)" 910, where full range integer motion estimation and fractional motion estimation are also performed to obtain more candidate motion vectors for the current block. The PMV of the first pass may be used as the cost center for the searches.

Process 900 may include "determine prediction mode decision" 912, and by one form, by determining the overall cost of the prediction mode which considers the distortions of the intra mode, the IME, and FME as well the bit cost for DCT and so forth. By other forms, the PMV, or each candidate prediction mode for determining the PMV (including HME, ZMV and prior frame collocated MV), may be considered separately for best prediction mode as well. The overall cost also may be the overall cost with the best quality.

Process 900 may continue with the middle pass 914, and include "compute current PMV" 916. In the middle pass, the current PMV is based on neighbor reference blocks on the prior frame, and the current PMV may be a combination of the motion vectors of the reference blocks as mentioned above. Also as mentioned above, the references and block sizes may have been converged before computing the current PMV. Process 900 then may include "derive prior PMV of pass N−1" 918, which is the PMV from the first pass in the case of the single middle pass. By another alternative, the prior PMV may be the PMV of any prior pass as mentioned above.

Process 900 may include "compare the current PMV to prior PMV" 920, and "if PMVs are the same, use prediction mode result of prior pass as prediction mode" 922. Thus, if the current and prior PMV are the same by integer (or fractional) value, the prior result of the best prediction mode is used. Whether the intra coding mode or one of the inter-prediction modes is the best prediction mode, process 900 then may include "use result of prior pass as final prediction mode result" 926. The computed image data (and motion vector) from the prior pass and of the current block for the final prediction mode may be provided to determine a residual as mentioned above. The process then may continue to analyze a another current block on the frame, but the rest of the passes including any additional middle pass and the final pass are omitted saving VME time and reducing IME computations.

Otherwise, process 900 may include "if PMVs are close AND prediction mode distortion of current pass is less than or equal to the prediction mode distortion of the prior pass, use prediction mode result of prior pass as prediction mode" 924. Thus, the same result occurs as long as the PMVs are close, even though not exactly the same, as long as the distortion of the best prediction mode of the current pass is less than or equal to the distortion of the best prediction mode of the prior pass. Again, the prior pass best prediction mode will be considered final (operation 926), and this will end the best prediction mode decision for this current block.

In either way, the final prediction mode decision for the correct block is provided for compression and streaming to the decoder, while the predicted image data is provided to determine a residual to compress and transmit as well. It will be appreciated that the residual maybe a distortion already computed for prediction mode selection, and may be re-used as the residual.

Alternatively, process 900 may include "if PMVs are NOT close, perform full range IME and FME, and determine prediction mode decision for middle pass" 928. Thus, a best prediction mode so far, and refined motion vector may be provided for the middle pass and that is to be used by a next middle pass or the final pass. It will be understood that the current PMV of the middle pass could be considered one of the candidate prediction modes even though the current PMV may be the basis (cost center) of the IME search.

Process 900 may include "if PMVs are close, but best prediction mode distortion of current pass is NOT less than or equal to the best prediction mode distortion of the prior pass, perform short range IME and FME, and determine prediction mode decision for middle pass" 930. In this case, then, further block matching is still performed to form a refined PMV of the middle pass and of the frame, but now only short range IME is needed as described above. A new best mode decision is then performed for the middle pass to be used in the next middle pass or final pass. As mentioned above, the best prediction mode decision here is based on the best (or lowest) overall cost and may consider quality in the determination.

Process 900 may include "repeat for more middle passes" 932, and thus when multiple middle passes are used as explained above, the middle pass unit performs the same operations using the prior middle pass PMV and prediction mode distortion to compare against a new current PMV and distortion.

Process 900 may include "perform final pass" 934, and as mentioned, when the prior pass cannot be selected as the final best prediction mode of a current block. In this case, process 900 may continue with "derive spatially dependent PMV as current PMV" 936, and as explained above by using the motion vectors of pre-analyzed neighbor blocks on the same frame as a current block (spatially dependent on the neighbor blocks) to determine the motion vector of the current block. For comparison, process 900 also may include "derive prior PMV" 938, and the PMV from the most recent middle pass for example (but could be any prior pass). The prior PMV from the middle pass may be based on neighbor reference blocks on the frame prior to the current frame, as described above.

Process 900 may include "compare the current PMV to prior PMV" 940, and as also described herein, to determine if the PMVs are the same, which leads to a final determination of the best prediction mode as described above. Otherwise, operations 942 to 952 of the final pass are similar to operations 922 to 930 of the middle pass, and need not be re-described here except to say that the current PMV is now the spatially dependent-based PMV on the final pass, and which now may be considered in any further best prediction mode decision. Also, if the PMVs are not close, or the PMVS are close but the distortion of the current best prediction mode is greater than the prior best prediction, then the new best mode prediction decision that compares the overall costs of the prediction modes is a final decision and no other passes are performed for the current block. Thereafter, the data of the final selected best prediction mode is used as mentioned above.

While implementation of example process 400, 500, 600, and/or 900 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 10, an example image processing system (or video coding system) 1000 for providing video coding with a multi-pass prediction mode decision pipeline may be arranged in accordance with at least some implementations of the present disclosure. In the illustrated implementation, system 1000 may include one or more central processing units or processors 1003 including fixed function hardware such as VMEs 1006, processing unit(s) 1020 to provide the encoder and decoder discussed herein, one or more imaging devices 1001 to capture images, an antenna 1002 to receive or transmit image data, a display device 1005, and one or more memory stores 1004. Processor(s) 1003, memory store 1004, and/or display device 1005 may be capable of communication with one another, via, for example, a bus, wires, or other access. In various implementations, display device 1005 may be integrated in system 1000 or implemented separately from system 1000.

As shown in FIG. 10, and discussed above, the processing unit 1020 may have logic circuitry 1050 with an encoder 100 and optionally with a decoder 200. The encoder 100 may have an intra prediction unit 1052, an inter-prediction unit 1054 with a motion estimation unit 1056 and a motion compensation unit 1058. The motion estimation unit 1056 may provide the computations for any of the prediction modes, or more precisely motion estimation algorithms, mentioned above including the HME, ZMV, IME, and/or FME, or any others that could be used. The encoder 100 also may have a prediction mode decision unit 1060 to perform and control the multi-pass methods and may include a first pass unit 1062, a middle pass unit 1064 to control any number of middle passes, and a final pass unit 1066. It will be understood that each of these pass units includes the code relevant to performing that pass and does not necessarily mean that the code of one pass is somehow separate from the code of another pass. It will be understood that the prediction mode decision unit 1060 also may be, or may be part of, multi-pass unit 215 and/or prediction mode analyzer and mode selector 238 (FIG. 2). These units of the logic circuitry provide many of the functions described herein and as explained with the processes described herein.

As will be appreciated, the modules illustrated in FIG. 10 may include a variety of software and/or hardware modules and/or modules that may be implemented via software or hardware or combinations thereof. For example, the modules may be implemented as software via processing units 1020 or the modules may be implemented via a dedicated hardware portion. Also, system 1000 may be implemented in a variety of ways. For example, system 1000 (excluding display device 1005) may be implemented as a single chip or device having an accelerator or a graphics processor unit (GPU) which may or may not have image signal processors (ISPs), a quad-core central processing unit, and/or a memory controller input/output (I/O) module. In other examples, system 1000 (again excluding display device 1005) may be implemented as a chipset or a system on a chip (SoC). It will be understood antenna 1002 could be used to receive image data for encoding as well.

Otherwise, processor(s) 1003 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like. The implementation is not limited as long as kernels used to perform video coding prediction tasks can use software, firmware, and/or hardware to run on execution units that can call fixed function hardware such as the VMEs 1006 to efficiently perform repetitive computations such as for block-matching or spatial dependency calculations, or other tasks, and consistent with the description above. The VMEs may be in the form of a block in the hardware whether dedicated or not for this purpose. This may be placed in the graphics hardware, or could be a discrete GPU.

In addition, memory stores 1004 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1004 also may be implemented via cache memory.

In various implementations, the example video coding system 1000 may use the imaging device 1001 to form or receive captured image data. This can be implemented in various ways. Thus, in one form, the image processing system 1000 may be one or more digital cameras or other image capture devices, and imaging device 1001, in this case, may be the camera hardware and camera sensor software, module, or component 1050. In other examples, video coding system 1000 may have an imaging device 1001 that includes or may be one or more cameras, and logic modules 1050 may communicate remotely with, or otherwise may be communicatively coupled to, the imaging device 1001 for further processing of the image data.

Thus, video coding system 1000 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1001 may include camera hardware and optics including one or more sensors as well as auto-focus, zoom, aperture, ND-filter, auto-exposure, flash, and actuator controls. The imaging device 1001 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1001 may be provided with an eye tracking camera. Otherwise, the imaging device 1001 may be any other device that records, displays or processes digital images such as video game panels or consoles, set top boxes, and so forth.

As illustrated, any of these components may be capable of communication with one another and/or communication with portions of logic modules 1050 and/or imaging device 1001. Thus, processors 1003 may be communicatively coupled to both the image device 1001 and the logic modules 1050 for operating those components. Although image processing system 1000, as shown in FIG. 10, may include one particular set of blocks or actions associated with particular components or modules, these blocks or actions may be associated with different components or modules than the particular component or module illustrated here.

Figure 11:
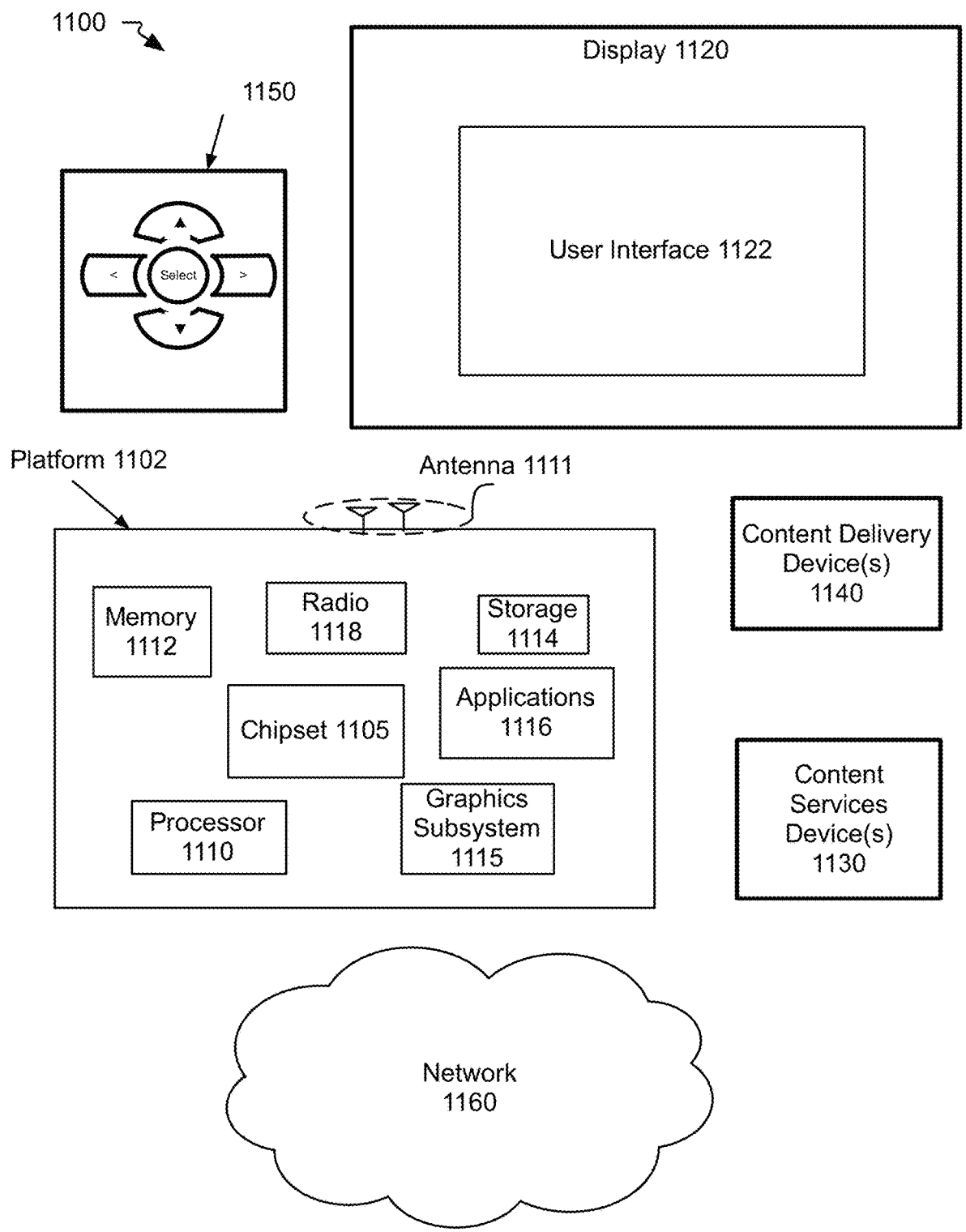
FIG. 11 is an illustrative diagram of another example system.

Referring to FIG. 11, an example system 1100 in accordance with the present disclosure and various implementations may embody system 1000 for example, and may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 communicatively coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118 as well as antenna(s) 1111. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
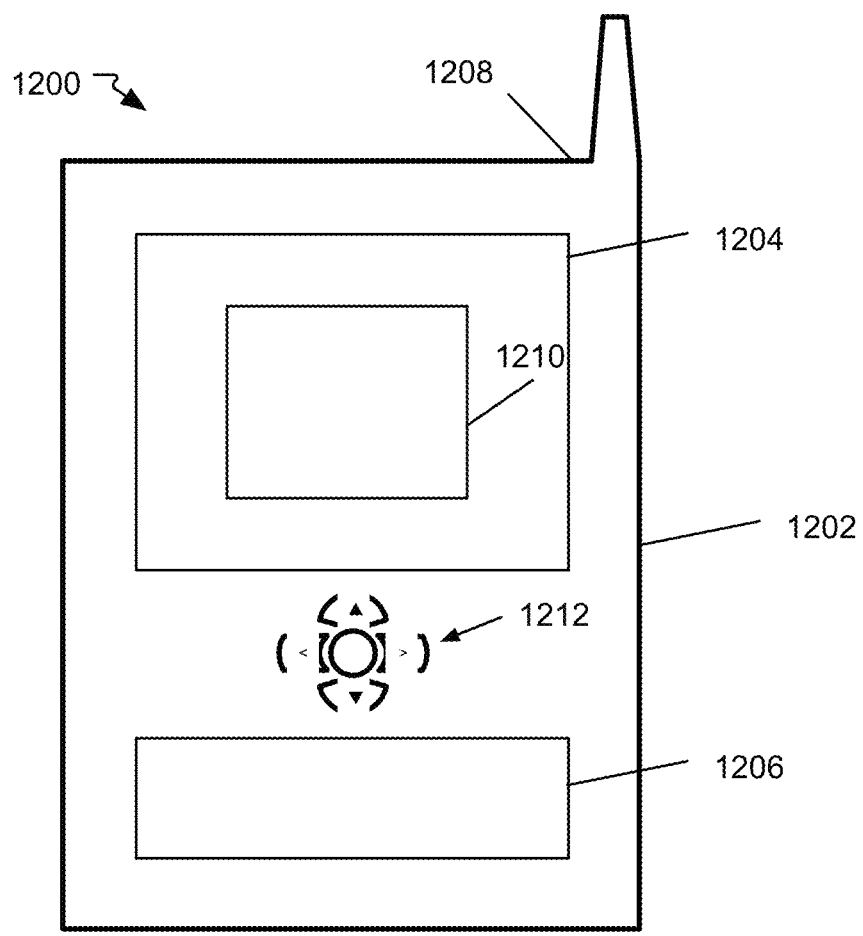
FIG. 12 illustrates another example device, all arranged in accordance with at least some implementations of the present disclosure.

As described above, system 1000 or 1100 may be implemented in varying physical styles or form factors. FIG. 12 illustrates implementations of a small form factor device 1200 in which system 1000 or 1100 may be implemented. In implementations, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable screen 1210 on a display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of video coding comprises obtaining a plurality of frames of a video sequence to encode wherein individual frames are divided into blocks of pixel data; and generating a best prediction mode decision of individual current blocks of at least one of the frames. This comprises performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

By another implementation, a computer-implemented method of video decoding comprises obtaining a plurality of compressed frames of a video sequence to decode wherein individual frames are divided into blocks of pixel data; and obtaining prediction data comprising a prediction mode of a current block of one of the frames, the prediction mode being selected at an encoder, at least in part, by: generating a best prediction mode decision of individual current blocks of one of the frames comprising: performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

For either the encoding method or the decoding method, the method also may comprise wherein the use of data from other blocks on the same frame as the current block to form a motion vector of the current block is limited to a final pass of the multiple prediction passes; and where the method comprises (or the prediction mode being selected at an encoder, at least in part, by): using at least one of the following prediction modes in the first pass to determine a predicted motion vector (PMV) of the current block: a zero motion vector, hierarchical motion estimation (HME), and the motion vector of the same block position on a previous frame relative to a current frame of the current block; using the PMV as a basis of at least one of integral motion estimation (IME) and fractional motion estimation (FME) in at least the first pass; determining a best prediction mode in a first pass among at least intra prediction, IME, and FME prediction modes; comparing prediction data of at least one prediction mode of a middle or final pass to the prediction data of a best prediction mode of the first pass; omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes; in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame; and determining a best prediction mode based, at least in part, on whether a distortion of a current best prediction mode is less than or equal to the distortion of a best prediction mode on a previous pass; wherein a determination that a best prediction mode distortion of a current pass is less than or equal to the distortion of the best prediction mode of a prior pass indicates that intra coding is the final best prediction mode of the current block avoids performance of any more integer motion estimation to determine a motion vector of the current block; and wherein the operations of each pass or multiple passes are dispatched as a separate batch command.

A system comprises at least one display; at least one memory to store frames of a video sequence wherein individual frames have image data with pixels divided into blocks; at least one processor communicatively coupled to the at least one of the memory and display; and a multi-pass prediction mode decision unit operated by the at least one processor and operated by: generating a best prediction mode decision of individual current blocks of one of the frames comprising: performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

The system further may comprise wherein the multiple prediction passes are performed with at least one middle pass and a final pass, and wherein the use of data from other blocks on the same frame as the current block to determine a motion vector of the current block is limited to the final pass; wherein a predicted motion vector of a previous pass is compared to a predicted motion vector of another pass to determine, at least in part, a best prediction mode of the current block; wherein a distortion of a best prediction mode of a previous pass is compared to the distortion of a best prediction mode of a current past to determine, at least in part, a final best prediction mode of the current block; wherein the multiple prediction passes comprise a first pass, at least one middle pass, and a final pass, wherein the multi-pass prediction mode decision unit is operated by adjusting the number of middle passes to be performed; wherein the multi-pass prediction mode decision unit is operated by modifying the current block size after the start of the first pass and before a next pass uses the current block data; and wherein the multi-pass prediction mode decision unit is operated by reducing a number of reference frames used to determine one or more motion vectors of the current block after the start of the first pass and before a next pass uses the reference frame data.

A computer readable medium having stored thereon instructions that when executed cause a computing device to: obtaining a plurality of frames of a video sequence to encode wherein individual frames are divided into blocks of pixel data; and generating a best prediction mode decision of individual current blocks of one of the frames comprising: performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

The instructions also may cause the computing device to operate wherein the use of data from other blocks on the same frame as the current block to form a motion vector of the current block is limited to a final pass of the multiple prediction passes; and where the instructions cause the computing device to operate by using at least one of the following prediction modes in the first pass to determine a predicted motion vector (PMV) of the current block: a zero motion vector, hierarchical motion estimation (HME), and the motion vector of the same block position on a previous frame relative to a current frame of the current block; using the PMV as a basis of at least one of integral motion estimation (IME) and fractional motion estimation (FME) in at least the first pass; determining a best prediction mode in a first pass among at least intra prediction, IME, and FME prediction modes; comparing prediction data of at least one prediction mode of a middle or final pass to the prediction data of a best prediction mode of the first pass; omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes; in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame; and determining a best prediction mode based, at least in part, on whether a distortion of a current best prediction mode is less than or equal to the distortion of a best prediction mode on a previous pass; wherein a determination that a best prediction mode distortion of a current pass is less than or equal to the distortion of the best prediction mode of a prior pass indicates that intra coding is the final best prediction mode of the current block avoids performance of any more integer motion estimation to determine a motion vector of the current block; and wherein the operations of each pass or multiple passes are dispatched as a separate batch command.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
    obtaining a plurality of frames of a video sequence to encode wherein individual frames are divided into blocks of pixel data; and
    generating a best prediction mode decision of individual current blocks of at least one of the frames comprising:
        performing multiple prediction passes for an individual current block comprising forming a prediction mode decision at each pass of the multiple prediction passes, and
        performing at least a first pass without using data from other blocks on the same frame as the current block to determine a motion vector of the current block and of the first pass.

2. The method of claim 1 wherein the use of data from other blocks on the same frame as the current block to form a motion vector of the current block is limited to a final pass of the multiple prediction passes.

3. The method of claim 1 wherein no current block uses block data of any block in the same frame as the current block to form a motion vector in both the first pass and at least one middle pass that is not the final pass of the multiple prediction passes.

4. The method of claim 3 wherein data of blocks in the same frame as the current block are not used in any middle pass of the multiple prediction passes to form a motion vector of the middle pass.

5. The method of claim 1 wherein the multiple prediction passes are arranged to provide a first pass and at least one middle pass to individually form preliminary best prediction mode decisions, and a final pass forms the final prediction mode decision, and wherein the preliminary best mode predictions are transformable to a final prediction mode decision without performing further passes depending on the similarity of a motion vector of one pass to a motion vector of a previous pass and of the current block.

6. The method of claim 1 comprising using at least one of the following prediction modes in the first pass to determine a predicted motion vector (PMV) of the current block: a zero motion vector, hierarchical motion estimation (HME), and the motion vector of the same block position on a previous frame relative to a current frame of the current block.

7. The method of claim 6 comprising using the PMV as a basis of at least one of integral motion estimation (IME) and fractional motion estimation (FME) in at least the first pass.

8. The method of claim 1 comprising determining a best prediction mode in a first pass among at least intra prediction, IME, and FME prediction modes; and
comparing prediction data of at least one prediction mode of a middle or final pass to the prediction data of a best prediction mode of the first pass.

9. The method of claim 1 comprising, in at least one middle pass, using a predicted motion vector (PMV) from a previous pass to compare to a PMV of the current middle pass of the multiple prediction passes to determine a prediction mode decision in the current middle pass.

10. The method of claim 1 comprising omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes.

11. The method of claim 1 comprising, in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame.

12. The method of claim 1 comprising determining a best prediction mode based, at least in part, on whether a distortion of a current best prediction mode is less than or equal to the distortion of a best prediction mode on a previous pass.

13. The method of claim 1 wherein the use of data from other blocks on the same frame as the current block to form a motion vector of the current block is limited to a final pass of the multiple prediction passes;
the method comprising:
using at least one of the following prediction modes in the first pass to determine a predicted motion vector (PMV) of the current block: a zero motion vector, hierarchical motion estimation (HME), and the motion vector of the same block position on a previous frame relative to a current frame of the current block;
using the PMV as a basis of at least one of integral motion estimation (IME) and fractional motion estimation (FME) in at least the first pass;
determining a best prediction mode in a first pass among at least intra prediction, IME, and FME prediction modes;
comparing prediction data of at least one prediction mode of a middle or final pass to the prediction data of a best prediction mode of the first pass;
omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes;
in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame; and
determining a best prediction mode based, at least in part, on whether a distortion of a current best prediction mode is less than or equal to the distortion of a best prediction mode on a previous pass;
wherein a determination that a best prediction mode distortion of a current pass is less than or equal to the distortion of the best prediction mode of a prior pass indicates that intra coding is the final best prediction mode of the current block avoids performance of any more integer motion estimation to determine a motion vector of the current block; and
wherein the operations of each pass or multiple passes are dispatched as a separate batch command.

14. A computer-implemented method of video decoding comprising:
obtaining a plurality of compressed frames of a video sequence to decode wherein individual frames are divided into blocks of pixel data; and
obtaining prediction data comprising a prediction mode of a current block of one of the frames, the prediction mode being selected at an encoder, at least in part, by:
generating a best prediction mode decision of individual current blocks of one of the frames comprising:
performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

15. The method of claim 14 wherein the use of data from other blocks on the same frame as the current block to form a motion vector of the current block is limited to a final pass of the multiple prediction passes;
the prediction mode being selected at an encoder, at least in part, by:
using at least one of the following prediction modes in the first pass to determine a predicted motion vector (PMV) of the current block: a zero motion vector, hierarchical motion estimation (HME), and the motion vector of the same block position on a previous frame relative to a current frame of the current block;
using the PMV as a basis of at least one of integral motion estimation (IME) and fractional motion estimation (FME) in at least the first pass;
determining a best prediction mode in a first pass among at least intra prediction, IME, and FME prediction modes;
comparing prediction data of at least one prediction mode of a middle or final pass to the prediction data of a best prediction mode of the first pass;
omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes;
in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame; and determining a best prediction mode based, at least in part, on whether a distortion of a current best prediction mode is less than or equal to the distortion of a best prediction mode on a previous pass;

wherein a determination that a best prediction mode distortion of a current pass is less than or equal to the distortion of the best prediction mode of a prior pass indicates that intra coding is the final best prediction mode of the current block avoids performance of any more integer motion estimation to determine a motion vector of the current block; and wherein the operations of each pass or multiple passes are dispatched as a separate batch command.

16. A computer-implemented system comprising:
at least one display;
at least one memory to store frames of a video sequence wherein individual frames have image data with pixels divided into blocks;
at least one processor communicatively coupled to the at least one of the memory and display; and
a multi-pass prediction mode decision unit operated by the at least one processor and operated by:
generating a best prediction mode decision of individual current blocks of one of the frames comprising:
performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

17. The system of claim 16 wherein the multiple prediction passes are performed with at least one middle pass and a final pass, and wherein the use of data from other blocks on the same frame as the current block to determine a motion vector of the current block is limited to the final pass.

18. The system of claim 16 wherein a predicted motion vector of a previous pass is compared to a predicted motion vector of another pass to determine, at least in part, a best prediction mode of the current block.

19. The system of claim 16 wherein a distortion of a best prediction mode of a previous pass is compared to the distortion of a best prediction mode of a current past to determine, at least in part, a final best prediction mode of the current block.

20. The system of claim 16 wherein the multiple prediction passes comprise a first pass, at least one middle pass, and a final pass, wherein the multi-pass prediction mode decision unit is operated by adjusting the number of middle passes to be performed.

21. The system of claim 16 wherein the multi-pass prediction mode decision unit is operated by modifying the current block size after the start of the first pass and before a next pass uses the current block data.

22. The system of claim 16 wherein the multi-pass prediction mode decision unit is operated by reducing a number of reference frames used to determine one or more motion vectors of the current block after the start of the first pass and before a next pass uses the reference frame data.

23. The system of claim 16 wherein the multiple prediction passes are performed with at least one middle pass and a final pass, and wherein the use of data from other blocks on the same frame as the current block to determine a motion vector of the current block is limited to the final pass;

wherein a predicted motion vector of a previous pass is compared to a predicted motion vector of another pass to determine, at least in part, a best prediction mode of the current block;

wherein a distortion of a best prediction mode of a previous pass is compared to the distortion of a best prediction mode of a current past to determine, at least in part, a final best prediction mode of the current block;

wherein the multiple prediction passes comprise a first pass, at least one middle pass, and a final pass, wherein the multi-pass prediction mode decision unit is operated by adjusting the number of middle passes to be performed;

wherein the multi-pass prediction mode decision unit is operated by modifying the current block size after the start of the first pass and before a next pass uses the current block data; and wherein the multi-pass prediction mode decision unit is operated by reducing a number of reference frames used to determine one or more motion vectors of the current block after the start of the first pass and before a next pass uses the reference frame data.

24. A non-transitory computer-readable medium having stored thereon instructions that when executed cause a computing device to:
obtaining a plurality of frames of a video sequence to encode wherein individual frames are divided into blocks of pixel data; and
generating a best prediction mode decision of individual current blocks of one of the frames comprising:
performing multiple prediction passes for an individual current block comprising forming a prediction mode decision at each pass of the multiple prediction passes, and performing at least a first pass without using data from other blocks on the same frame as the current block to determine a motion vector of the current block and of the first pass.

25. The non-transitory computer-readable medium of claim 24 wherein the use of data from other blocks on the same frame as the current block to form a motion vector of the current block is limited to a final pass of the multiple prediction passes;

wherein the instructions cause the computing device to operate by:
using at least one of the following prediction modes in the first pass to determine a predicted motion vector (PMV) of the current block: a zero motion vector, hierarchical motion estimation (HME), and the motion vector of the same block position on a previous frame relative to a current frame of the current block;

using the PMV as a basis of at least one of integral motion estimation (IME) and fractional motion estimation (FME) in at least the first pass;

determining a best prediction mode in a first pass among at least intra prediction, IME, and FME prediction modes;

comparing prediction data of at least one prediction mode of a middle or final pass to the prediction data of a best prediction mode of the first pass;

omitting a final pass that uses data of other blocks in the same frame as a current block when it is determined that a result of a prediction mode decision of the first pass or a middle pass is to be a final prediction mode decision depending on a comparison of predicted motion vectors (PMVs) of two different passes;

in a middle pass, determining a best prediction mode based, at least in part, on whether a prediction motion vector (PMV) of a previous pass is the same or similar to a current predicted motion vector (PMV) of the current block, wherein the current PMV is based on, at least in part, blocks nearby to a position on a prior frame that corresponds to the same position of the current block on the current frame; and determining a best prediction mode based, at least in part, on whether a distortion of a current best prediction mode is less than or equal to the distortion of a best prediction mode on a previous pass;

wherein a determination that a best prediction mode distortion of a current pass is less than or equal to the distortion of the best prediction mode of a prior pass indicates that intra coding is the final best prediction mode of the current block avoids performance of any more integer motion estimation to determine a motion vector of the current block; and wherein the operations of each pass or multiple passes are dispatched as a separate batch command.

* * * * *